(12) United States Patent
Nakamura et al.

(10) Patent No.: US 10,371,918 B2
(45) Date of Patent: Aug. 6, 2019

(54) IMAGING DEVICE, OPTICAL DEVICE, ELECTRONIC DEVICE, VEHICLE, AND PRODUCTION METHOD FOR IMAGING DEVICE

(71) Applicant: Nidec Copal Corporation, Tokyo (JP)

(72) Inventors: Yuta Nakamura, Tokyo (JP); Ryo Kikuta, Tokyo (JP); Yuhei Kobayashi, Tokyo (JP); Kiyoshi Toma, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 1 day.

(21) Appl. No.: 15/514,202

(22) PCT Filed: Aug. 26, 2015

(86) PCT No.: PCT/JP2015/074119
§ 371 (c)(1),
(2) Date: Mar. 24, 2017

(87) PCT Pub. No.: WO2016/047354
PCT Pub. Date: Mar. 31, 2016

(65) Prior Publication Data
US 2017/0307841 A1    Oct. 26, 2017

(30) Foreign Application Priority Data

Sep. 25, 2014  (JP) .................. 2014-194815
Sep. 26, 2014  (JP) .................. 2014-196782
Dec. 27, 2014  (JP) .................. 2014-266805

(51) Int. Cl.
G02B 7/02      (2006.01)
B60R 11/04     (2006.01)
(Continued)

(52) U.S. Cl.
CPC .............. *G02B 7/022* (2013.01); *B60R 11/04* (2013.01); *G02B 7/02* (2013.01); *G02B 7/026* (2013.01);
(Continued)

(58) Field of Classification Search
CPC . G02B 7/04; G02B 7/08; G02B 7/023; G02B 7/02; G02B 7/021; G02B 7/09;
(Continued)

(56) References Cited

U.S. PATENT DOCUMENTS

2003/0112532 A1* 6/2003 Takanashi ............ G02B 6/3526
                                                 359/822
2007/0141881 A1    6/2007 Lee
(Continued)

FOREIGN PATENT DOCUMENTS

JP    S57202508 A    12/1982
JP    H07106789 A     4/1995
(Continued)

OTHER PUBLICATIONS

International Search Report (English and Japanese) and PCT Written Opinion (Japanese) dated Oct. 20, 2015 issued in corresponding PCT International Application No. PCT/JP2015/074119.

*Primary Examiner* — Mahidere S Sahle
(74) *Attorney, Agent, or Firm* — Troutman Sanders LLP

(57) ABSTRACT

An imaging device has a lens group; a lens barrel for holding the lens group; a base member for holding the lens barrel; an imaging element; a securing plate that faces at least a portion of the base member in a state wherein the imaging element is secured; and a coil spring for pressing the lens barrel to produce a state wherein a male threaded portion of the lens barrel is pressed against a female threaded portion of the base member.

9 Claims, 25 Drawing Sheets

(51) Int. Cl.
*G03B 17/12* (2006.01)
*H04N 7/18* (2006.01)
*G03B 17/55* (2006.01)
*G03B 43/00* (2006.01)
*H04N 5/225* (2006.01)
*B60R 11/00* (2006.01)

(52) U.S. Cl.
CPC ............ *G03B 17/12* (2013.01); *G03B 17/55* (2013.01); *G03B 43/00* (2013.01); *H04N 5/2252* (2013.01); *H04N 5/2254* (2013.01); *H04N 5/2257* (2013.01); *H04N 7/183* (2013.01); *B60R 2011/0052* (2013.01)

(58) Field of Classification Search
CPC ........ G02B 7/026; G02B 3/14; G02B 6/4244; G02B 27/62; G03B 3/10; G03B 5/00; G03B 5/02; G03B 13/36; G03B 17/12; G03B 2205/0092; G03B 2205/0046; G03B 2205/0069; H04N 5/2254; H04N 5/2257; H04N 5/23212; H04N 5/23296; H04N 5/23287
USPC .................................................. 359/811–830
See application file for complete search history.

(56) References Cited

U.S. PATENT DOCUMENTS

| | | | | |
|---|---|---|---|---|
| 2008/0259469 | A1* | 10/2008 | Arai | G02B 7/02 359/819 |
| 2008/0316623 | A1* | 12/2008 | Aoki | G02B 7/04 359/823 |
| 2012/0019905 | A1* | 1/2012 | Teraoka | G02B 7/021 359/356 |
| 2014/0002676 | A1* | 1/2014 | Ning | G02B 7/14 348/187 |
| 2016/0025950 | A1* | 1/2016 | Lamontagne | G02B 7/022 359/829 |

FOREIGN PATENT DOCUMENTS

| | | |
|---|---|---|
| JP | H07183993 A | 7/1995 |
| JP | H11231191 A | 8/1999 |
| JP | 2003249773 A | 9/2003 |
| JP | 2004282142 A | 10/2004 |
| JP | 2005215369 A | 8/2005 |
| JP | 2006276572 A | 10/2006 |
| JP | 2006330120 A | 12/2006 |
| JP | 2007171950 A | 7/2007 |
| JP | 2011077927 A | 4/2011 |
| KR | 20070064892 A | 6/2007 |

* cited by examiner

Press Direction

IMAGING DEVICE, OPTICAL DEVICE, ELECTRONIC DEVICE, VEHICLE, AND PRODUCTION METHOD FOR IMAGING DEVICE

CROSS-REFERENCE TO RELATED APPLICATIONS

This is a U.S. national phase application under 35 U.S.C. § 371 of International Patent Application No. PCT/JP2015/074119, filed Aug. 26, 2015, and claims benefit of priority to Japanese Patent Application Nos. 2014-194815, filed Sep. 25, 2014, 2014-196782, filed Sep. 26, 2014, and 2014-266805 filed Dec. 27, 2014. The entire contents of these applications are hereby incorporated by reference.

FIELD OF TECHNOLOGY

The present invention relates to an imaging device, an optical device, an electronic device, a vehicle, and a method for manufacturing an imaging device.

BACKGROUND

An imaging device has been proposed that is provided with a lens barrel (a lens holder) for holding the lens group, a printed circuit board whereon an imaging element is mounted, and a lens barrel holding member for holding the lens barrel (see, for example, Japanese Unexamined Patent Application Publication No. 2005-215369). The lens barrel holding member is secured to the printed circuit board. Here a male threaded portion is provided on the outer peripheral surface of the lens barrel and a female threaded portion is provided on the inner peripheral surface of a through hole in the lens barrel holding member, and the lens barrel is held in a state wherein the male threaded portion of the lens barrel is screwed into the female threaded portion. Moreover, in this imaging device, the amount to which the male threaded portion of the lens barrel is screwed into the female threaded portion of the lens barrel holding member can be adjusted to adjust the position of the lens group.

SUMMARY

However, in the imaging device set forth in Patent Document 1, if a gap exists between the male threaded portion of the lens barrel and the female threaded portion of the lens barrel holding member, this may cause there to be play in the lens barrel, preventing accurate adjustment of the optical axis of the lens group.

The present invention was created in contemplation of the reasoning above, and the object thereof is to provide an imaging device, an optical device, an electronic device, a vehicle, and a manufacturing method for an imaging device, wherein the lens group optical axis adjustment can be carried out accurately.

In order to achieve the object set forth above, an imaging device according to a first aspect of the present invention includes
 a lens group;
 a lens barrel for holding the lens group;
 a lens barrel holding member for holding the lens barrel;
 an imaging element;
 a securing plate that is disposed facing at least a portion of the lens barrel holding member in a state wherein the imaging element is secured; and
 a pressing member for pressing the lens barrel to produce a state wherein at least a portion of the lens barrel is pressed against a portion of the lens barrel holding member.

Moreover, the lens barrel holding member may also have a first through hole into which the lens barrel is inserted; and
 the pressing member may bias the lens barrel along the axis of the first through hole in the direction away from the lens barrel holding member, in a state wherein the lens barrel is attached and the lens barrel is inserted into the first through hole.

Moreover, the lens barrel may also have a male threaded portion that is formed on an outer peripheral surface of the lens barrel; and
 the lens barrel holding member may have
 a female threaded portion, formed on the inner peripheral surface of the first through hole, for screwing together with the male threaded portion; and
 a contacting surface that is perpendicular to the axis of the first through hole and that makes facial contact with one face, in the thickness direction, of the securing plate.

Moreover, the lens barrel holding member may have a guiding portion for guiding the lens barrel so that the axis of the lens barrel will be coincident with the axis of the first through hole; and
 the lens barrel may have a guided portion that is guided by the guiding portion.

Moreover, the guiding portions may be formed on both sides of the female threaded portion in the inner peripheral surface of the first through hole; and
 the guided portions may be formed on both sides of the male threaded portion on the outer peripheral surface of the lens barrel.

Moreover, the guiding portion may be formed so as to contact at least a portion of the guided portion.

Moreover, the pressing member may be structured from a coil spring.

Moreover, the pressing member may be structured from a leaf spring.

Moreover, the securing plate may be secured by an adhesive agent to the lens barrel holding member.

Moreover, the imaging device may further include a securing member that is long and thin, for securing the lens barrel holding member in a state wherein the lens barrel holding member protrudes toward the imaging element side, wherein:
 the securing plate has a second through hole into which the securing member is inserted through passing through, in the thickness direction of the securing plate, at a position that corresponds to the securing member that is secured to the lens barrel holding member.

Moreover, the securing member may have an adhesive agent filling portion, that, in the plan view, has a wedge shapes, for filling with the adhesive agent.

Moreover, the lens barrel holding member may have a third through hole into which the lens barrel is inserted, and a first connecting hole for connecting from the outside face of the lens barrel holding member to the third through hole, extending in a direction that is perpendicular to the axis of the third through hole; and
 the pressing member may be attached to the lens barrel holding member in a state wherein at least a portion thereof is fitted into the first connecting hole, and presses the lens barrel in a direction that is perpendicular to the axis of the third through hole, in a state wherein the lens barrel is inserted into the third through hole.

Moreover, the lens barrel may also have a male threaded portion that is formed on an outer peripheral surface of the lens barrel; and the lens barrel holding member may have a female threaded portion, formed on an inner peripheral surface of the third through hole, for screwing together with the male threaded portion.

Moreover, an inclined surface for structuring a ridge portion of the male threaded portion may be in facial contact with an inclined surface for structuring a trough portion of the female threaded portion.

Additionally, the pressing member may include a plate-shaped main piece; and an elastic portion that can deform elastically, wherein:

the main piece contacts the outer peripheral surface of the main barrel in a state wherein the lens barrel is inserted into the third through hole.

Moreover, the elastic portion may press the main piece in a direction that is perpendicular to the axis of the third through hole, through an elastic force that is produced through elastic deformation.

Moreover, the imaging device may further have a circuit board having the imaging element mounted on one surface side thereof and having a first electronic component mounted on the other surface side thereof, disposed on the opposite side of the securing plate from the lens barrel holding member; and an adhesive agent that is interposed between the lens barrel holding member, the circuit board, and the securing plate, wherein:

the lens barrel holding member has a fourth through hole into which the lens barrel is inserted, and a second connecting hole for connecting from the outside face of the lens barrel holding member to the fourth through hole, extending in a direction that is perpendicular to the axis of the fourth through hole; and a female threaded portion is formed on an inner peripheral surface of the second connecting hole; and the pressing member is structured from a locking screw that screws together with the female threaded portion and that presses the lens barrel in a direction that is perpendicular to the axis of the fourth through hole, in a state wherein the lens barrel is inserted through the fourth through hole.

Moreover, the first electronic component may be mounted on the circuit board, on the other surface side that is not the facing portion that faces the lens barrel holding member in the direction of the optical axis of the lens group.

Moreover, the circuit board may be structured from a sheet-shaped flexible printed circuit board and further comprises an extending portion that extends from the facing portion; and a portion of the adhesive agent may be interposed between the lens barrel holding member and the extending portion.

Moreover, the imaging device may further have a securing member that is long and thin, for securing the lens barrel holding member in a state wherein the lens barrel holding member protrudes toward the imaging element side, wherein:

the securing plate has a fifth through hole through which the securing member is inserted, in a state wherein there is a gap from the side face of the securing member, at a position that corresponds to the securing member that is secured to the lens barrel holding member; and a portion of the adhesive agent is disposed in a gap that is produced between the securing member and the fifth through hole.

Moreover, the imaging device may further include a second electronic component that is mounted on the one side surface of the circuit board; and a heat dissipating grease, interposed between the lens barrel holding member and the second electronic component, for transmitting, to the lens barrel holding member, the heat that is produced by the second electronic component, wherein:

the lens barrel holding member is disposed so as to cover the one surface side of the circuit board, and has a grease filling duct for filling the heat dissipating grease between the lens barrel holding member and the second electronic component.

Moreover, the grease filling duct may be structured in the lens barrel holding member from a sixth through hole that is formed in a position that faces the second electronic component in a direction that is perpendicular to the face of the circuit board on which the imaging element and the second electronic component are mounted.

Moreover, an optical device according to a second aspect according to the present invention is provided with an imaging device as set forth above.

Moreover, an electronic device according to a third aspect according to the present invention is provided with an imaging device as set forth above.

Moreover, a vehicle according to a fourth aspect according to the present invention is provided with an imaging device as set forth above.

Moreover, a method for manufacturing and imaging device according to a fifth aspect according to the present invention includes:

a step for securing a lens group in a lens barrel;

a step force holding the lens barrel in a lens barrel holding member;

a step for disposing the securing plate, to which the imaging element is secured, facing at least a portion of the lens barrel holding member; and a step for pressing the lens barrel so as to produce a state wherein at least a portion of the lens barrel is pressed against the portion of the lens barrel holding member.

The present invention enables the lens group optical axis adjustment to be carried out with good accuracy.

BRIEF DESCRIPTIONS OF THE DRAWINGS

DETAILED DESCRIPTION

Imaging devices according to various examples according to the present invention will be explained in detail below in reference to the drawings.

Example 1

Figure 1:
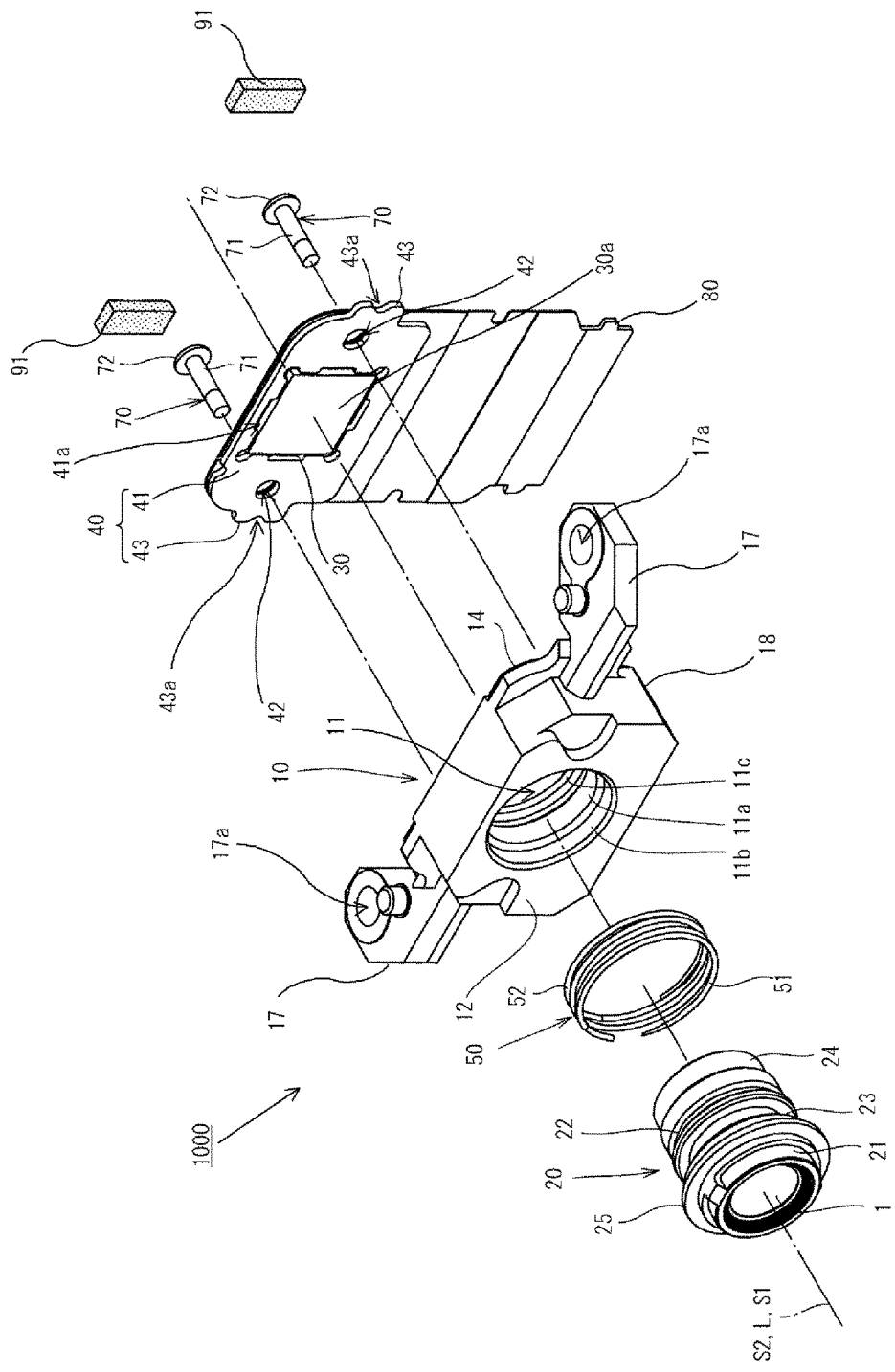
FIG. 1 is an assembly perspective diagram of an imaging device according to an example according to the present invention.
Figure 2:
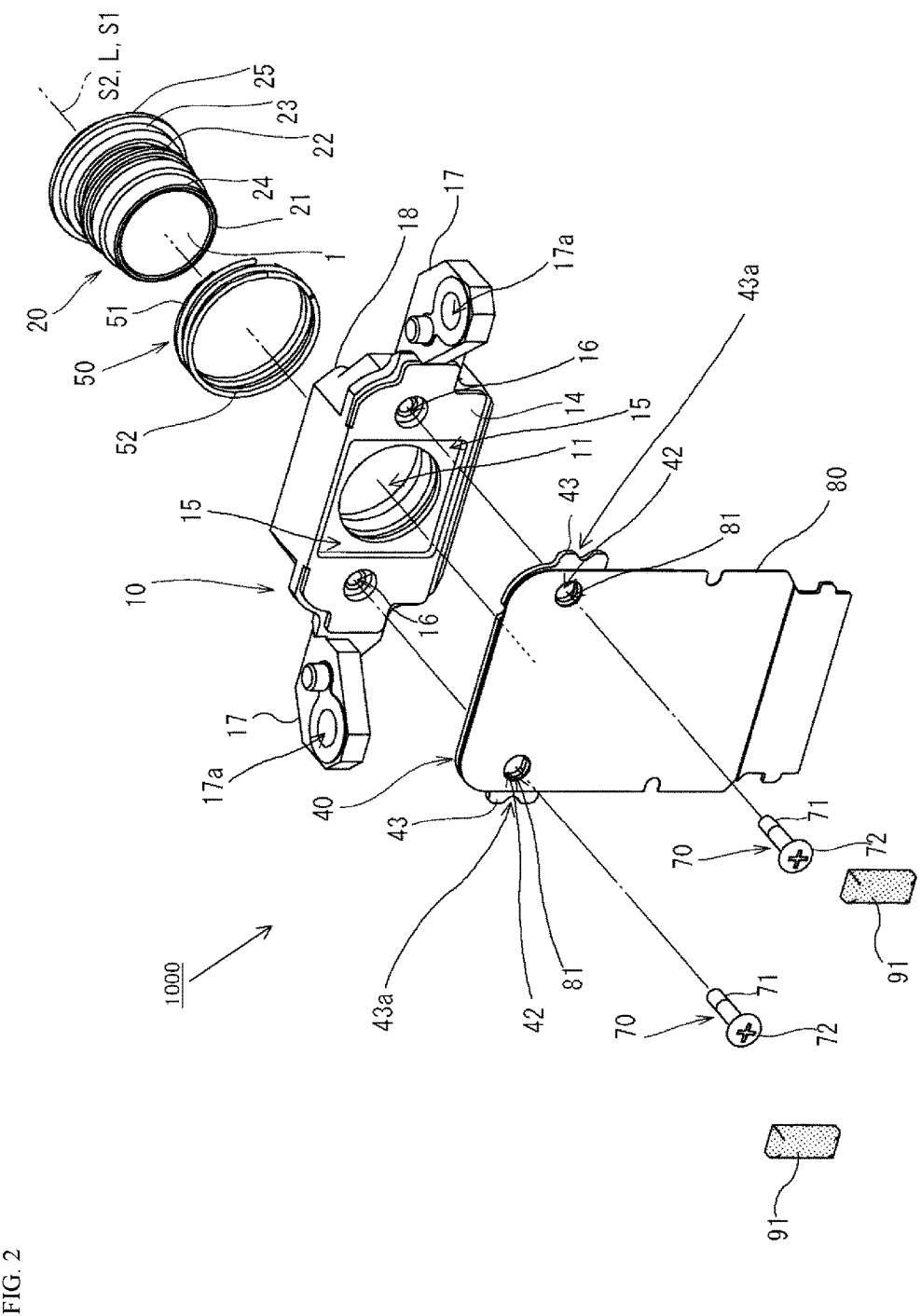
FIG. 2 is an assembly perspective diagram of an imaging device according to the example.
Figure 3:
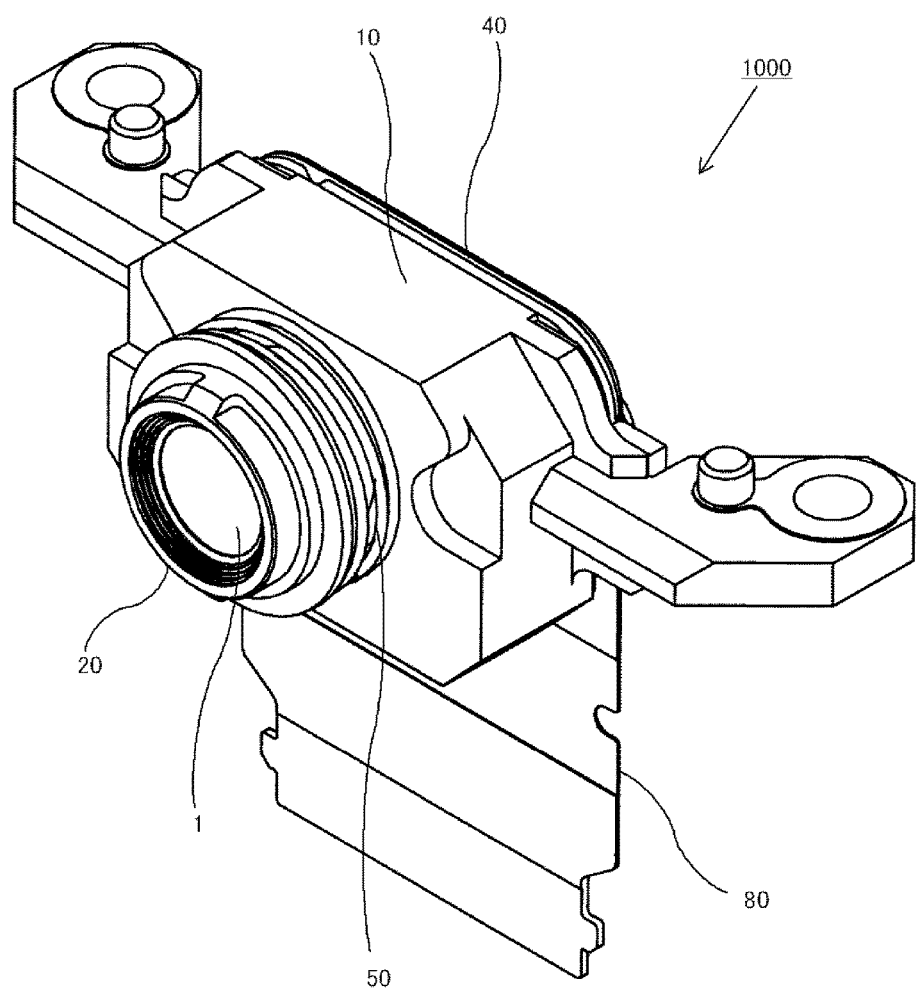
FIG. 3 is a perspective diagram of an imaging device according to the example.

The imaging device according to the present example is applied, for example, to a camera for vehicular use. As illustrated in FIG. 1 and FIG. 2, the imaging device 1000 according to the present example includes a lens group 1, a lens barrel 20 for holding the lens group 1, a base member (a lens barrel holding member) 10, a coil spring (a pressing member) 50, an imaging element 30, a securing plate 40, a circuit board 80, and screws 70. As appropriate, in the below, the explanations in FIG. 1 and FIG. 2 will define the direction toward the circuit board 80 along the optical axis L of the lens group 1 as toward the "back," and the opposite direction along the optical axis L as toward the "front." The securing plate 40 and the circuit board 80 are secured to the base member 10 by an adhesive agent 91. The imaging device 1000 has external appearance as illustrated in FIG. 3.

Figure 4A:
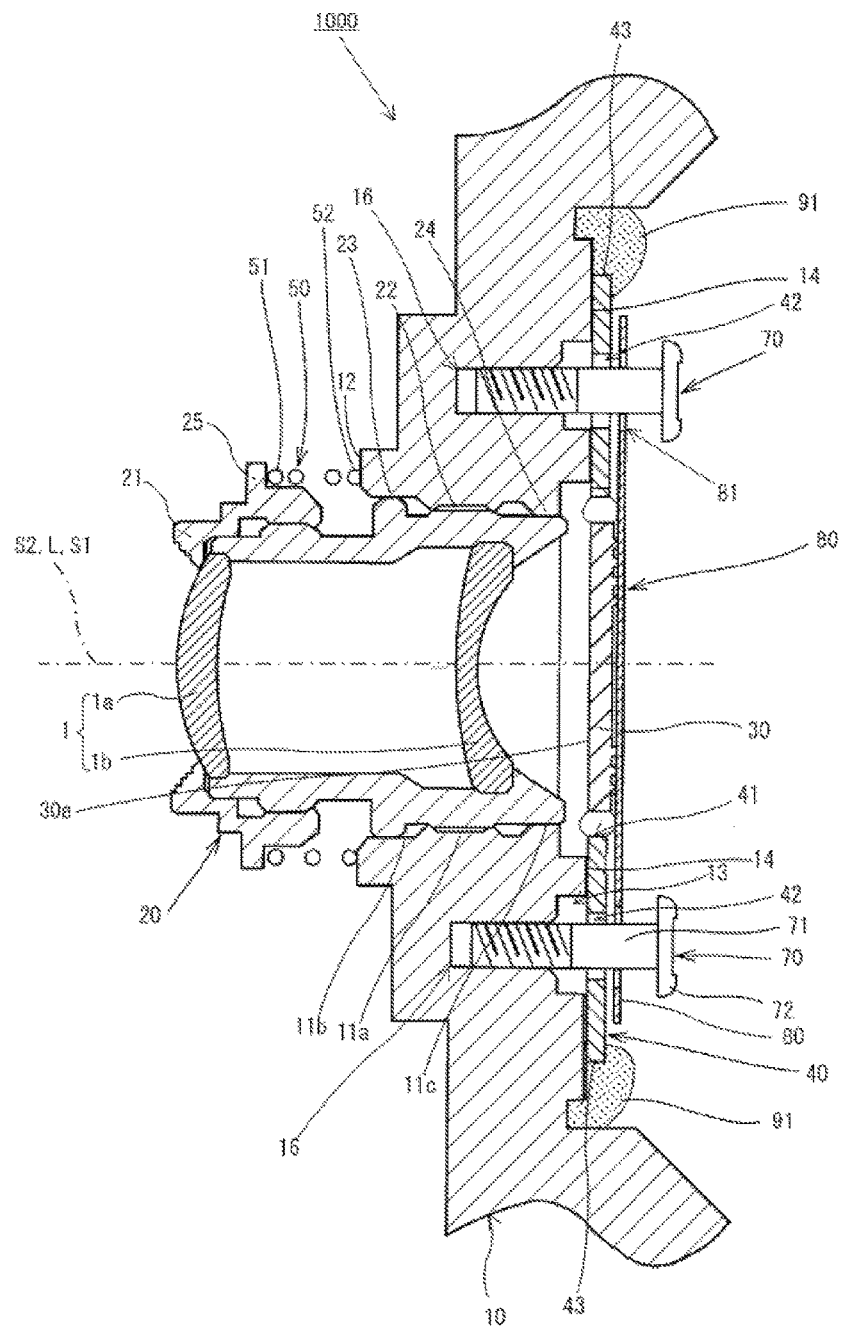
FIG. 4A is a cross-sectional diagram of an imaging device according to the example.

The lens group 1 is structured from lenses 1a and 1b, as illustrated in FIG. 4A. In a state wherein the lens group 1 is incorporated into the imaging device 1000, the lens 1b is disposed on the 1a side of the imaging element 30.

The lens barrel 20 is formed from a metal, a resin material, or the like. The lens barrel 20, as illustrated in FIG. 1 and FIG. 4A, has a cylinder portion 21 that is essentially cylindrical, for holding the lens group 1 on the inside, and a ring-shaped flange portion 25 for contacting a portion of a coil spring 50.

Lenses 1a and 1b are secured to the inner wall of the cylinder portion 21 so that the axis S2 thereof will be aligned with the optical axis L of the lens group 1. A male threaded portion 22 is formed on the outer peripheral surface of the cylinder portion 21, toward the lens 1b side of the center portion. Moreover, a front guiding portion (guided portion) 23 that extends in the radial direction of the cylinder portion 21 is provided on the outer peripheral surface of the cylinder portion 21, on the lens 1a side of the male threaded portion 22. Furthermore, a back guiding portion (guided portion) 24, which is recessed in the radial direction of the cylinder portion 21, is provided on the outer peripheral surface of the cylinder portion 21, on the lens 1b side of the male threaded portion 22.

The base member 10 is formed from a metal, a resin material, or the like. The base member 10, as illustrated in FIG. 1, FIG. 2, and FIG. 4A, comprises a flat rectangular lens barrel retaining portion 18 for holding the lens barrel 20, and two attaching portions 17 that are secured to the vehicle, or the like, when the imaging device 1000 is attached to a vehicle, or the like. The attaching portions 17 are formed integrally with the lens barrel retaining portion 18, and extend to both sides of the lens barrel retaining portion 18 in the lengthwise direction. Here "vehicle" refers to, for example, a vehicle for transporting passengers or cargo, such as a train or an automobile.

The lens barrel retaining portion 18 has a through hole (a first through hole) 11 that passes therethrough in the direction of thickness. A female threaded portion 11a is formed in essentially the center portion of the inner peripheral surface of the through hole 11. The female threaded portion 11a can be screwed together with the male threaded portion 22 of the lens barrel 20 to adjust the position of the lens barrel 20 relative to the base member 10 in the direction of the optical axis L of the lens group 1. Moreover, a front guiding portion 11b is formed on the inner peripheral surface of the through hole 11, toward the front of the female threaded portion 11a, and a back guiding portion 11c is formed toward the rear of the female threaded portion 11a. The front guiding portion 11b and the back guiding portion 11c are disposed such that, in a state wherein the base member 10 is incorporated into the imaging device 1000, the back guiding portion 11c is positioned on the imaging element 30 side of the front guiding portion 11b. When the lens barrel 20 is inserted into the through hole 11, the front guiding portion 11b is fitted into the front guiding portion 23 of the lens barrel 20, and the back guiding portion 11c is fitted into the back guiding portion 24 of the lens barrel 20. In this state, the axis S2 of the lens barrel 20, that is, the optical axis L of the lens group 1, will be coincident with the axis S1 of the through hole 11 of the base member 10.

As illustrated in FIG. 1 and FIG. 4A, in the front face 12 of the lens barrel retaining portion 18, the outer peripheral portion of the through hole 11 is flat. Moreover, a portion of the coil spring 50 contacts the front face 12 of the lens barrel retaining portion 18. Here the coil spring 50 is disposed in a state wherein it is compressed between the ring-shaped flange portion 25 of the lens barrel 20 and the front face 12 of the lens barrel retaining portion 18.

Moreover, as illustrated in FIG. 2, a recessed portion 15 that, in the plan view is essentially rectangular, surrounding the through hole 11, and two screw holes 16, positioned at two locations on either side of the recessed portion 15 in the lengthwise direction of the lens barrel retaining portion 18, in the outer peripheral portion of the recessed portion 15, are formed on the back face 14 of the lens barrel retaining portion 18. Screws 70 are screwed into the two screw holes 16 to prevent the securing plate 40 from coming off.

The outer peripheral portion of the recessed portion 15 at the back face 14 of the lens barrel retaining portion 18 structures a flat face that is perpendicular to the axis S1 of the through hole 11. The front face of the securing plate 40 makes facial contact with the back face 14 of the lens barrel retaining portion 18. Additionally, the securing plate 40 is slid over the back face 14 of the lens barrel retaining portion 18 to carry out positioning within the plane that is perpendicular to the optical axis L of the securing plate 40 (the axis S1). When viewed from the direction that is perpendicular to the axis S1, the area of the recessed portion 15 is set so as to be larger than the area of the imaging element 30 in the plan view. Additionally, the securing plate 40 can move within the plane that is perpendicular to the optical axis L (the axis S1) within a range wherein the imaging element 30 that is held on the securing plate 40 does not contact the peripheral edge portion of the recessed portion 15.

The attaching portion 17 is provided with insertion holes 17a into which are inserted screws (not shown) for attaching the imaging device 1000 to the vehicle, or the like.

The imaging element 30 is structured from a solid-state imaging element such as a CCD sensor, a CMOS sensor, or the like. As illustrated in FIG. 1 and FIG. 4A, the imaging element 30 is secured to the securing plate 40 so that the imaging surface 30a is parallel to the front face of the securing plate 40, that is, parallel to the face wherein the back face 14 of the base member 10 and the securing plate 40 make facial contact.

The securing plate 40 comprises an essentially rectangular plate-shaped main portion 41, and two chucking portions 43 that extend from both sides of the main portion 41 in the lengthwise direction, and that are chucked when the securing plate 40 is attached to the base member 10. The main portion 41 has an opening portion 41a that is essentially rectangular in the plan view, for holding the imaging element 30 therein, and two through holes (second through holes) 42, into which the screws 70 are inserted. The opening portion 41a is slightly larger than the outer dimensions of the imaging element 30. The imaging element 30 is secured to the securing plate 40, through an appropriate adhesive agent, or the like, in a state wherein it is fitted into the opening portion 41a.

Figure 5:
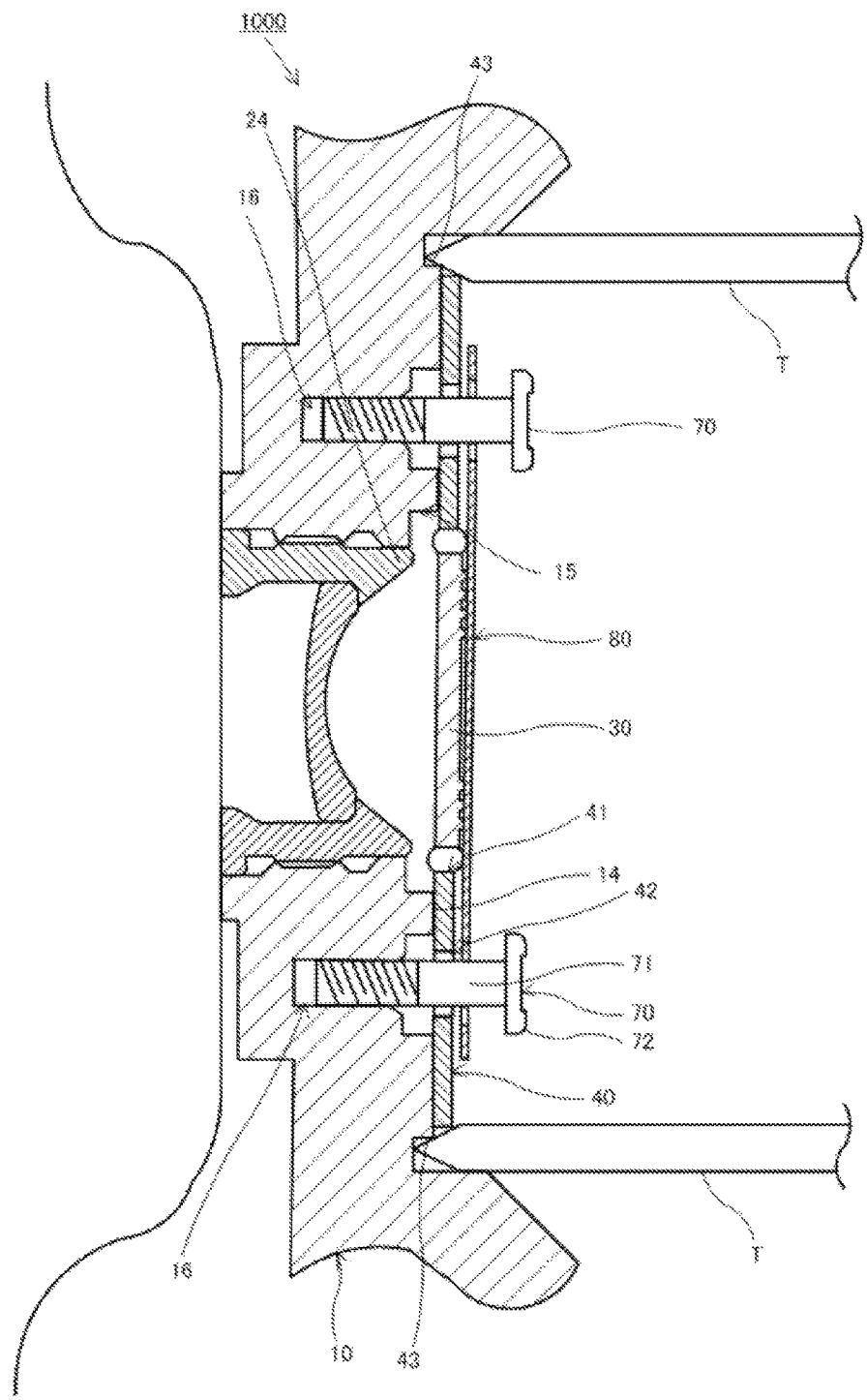
FIG. 5 is a cross-sectional view illustrating the state wherein a centering adjusting pin of the imaging device of the example is attached.

The inner diameter of the through holes 42 is set so as to be larger than the outer diameter of the shaft portions 71 of the screws 70, and set so as to be smaller than the outer diameter of the head portions 72 of the screws 70. Through this, the shaft portions 71 of the screws 70 are able to move within the through holes 42, enabling the securing plate 40 to move relative to the base member 10. The chucking portions 43 each has a notch portion 43a, which is of a wedge-shaped in the plan view, so as to enable handling through being held from both sides by a pair of rod-shaped gripping members. Moreover, the chucking portions 43, as illustrated in FIG. 4A, function as places into which an adhesive agent 91 is filled (adhesive agent filling portions) when an adhesive agent 91 is used to secure the securing plate 40 to the base member 10. As illustrated in FIG. 5, the securing plate 40 is handled in a state wherein it is held from both sides by gripping members T that are inserted into the notch portions 43a of the respective chucking portions 43.

Figure 6:
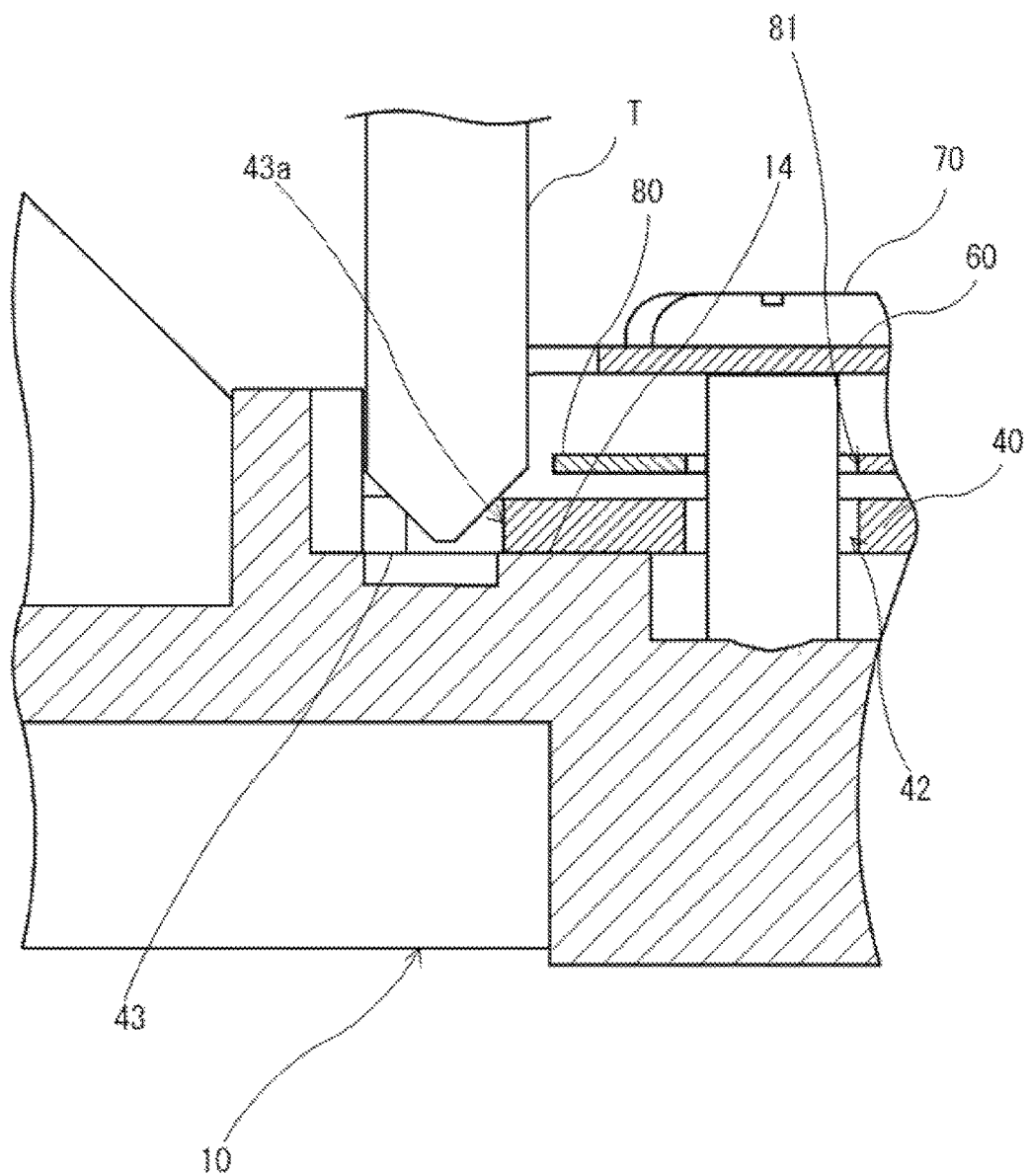
FIG. 6 is a partial enlarged cross-sectional view illustrating the state wherein a centering adjusting pin of the imaging device of the example is attached.
Figure 7:
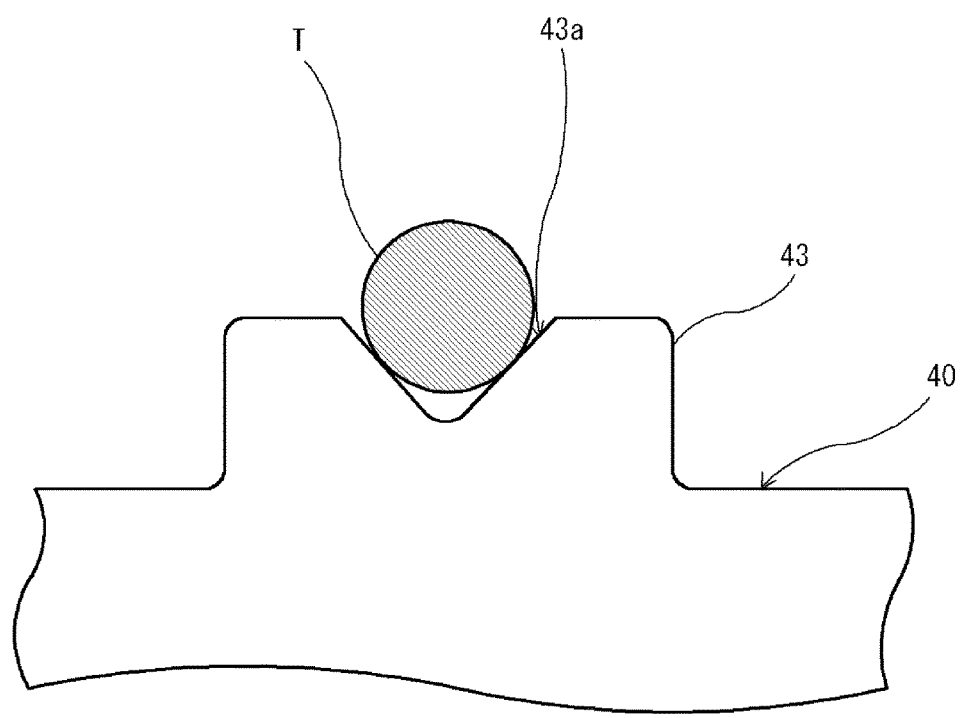
FIG. 7 is a partial enlarged plan view of a chucking portion of a securing plate according to the example.

Note that preferably, as illustrated in FIG. 5, the tip end portions of the gripping members T are cone shapes, that is, shapes that narrow toward the tip. This not only facilitates the insertion of the tip end portions of the gripping members T into the notch portions 43a of the chucking portions 43 of the securing plate 40, but also facilitates the securing plate 40 being held without a gap between the securing plate 40 and the back face 14 of the base member 10. In this case, the gripping members T are disposed in a state that is in contact with the peripheral edge portions of the notch portions 43a of the chucking portions 43, as illustrated in FIG. 6.

The circuit board 80 is structured from a sheet-shaped flexible printed circuit board. As illustrated in FIG. 1, the imaging element 30 is mounted on the front face of the circuit board 80. An interconnection (not shown) that is connected electrically to the imaging element 30 is formed on the front face of the circuit board 80. The circuit board 80 is disposed on the back surface side of the securing plate 40, in a state wherein the imaging element 30, which is mounted on the front face, is fitted into an opening portion 41a of the securing plate 40. Moreover, the circuit board 80 has through holes 81 that are formed respectively at positions corresponding to the two through holes 42 of the securing plate 40, in the state wherein the circuit board 80 is disposed on the back face side of the securing plate 40, as illustrated in FIG. 2.

Figure 4B:
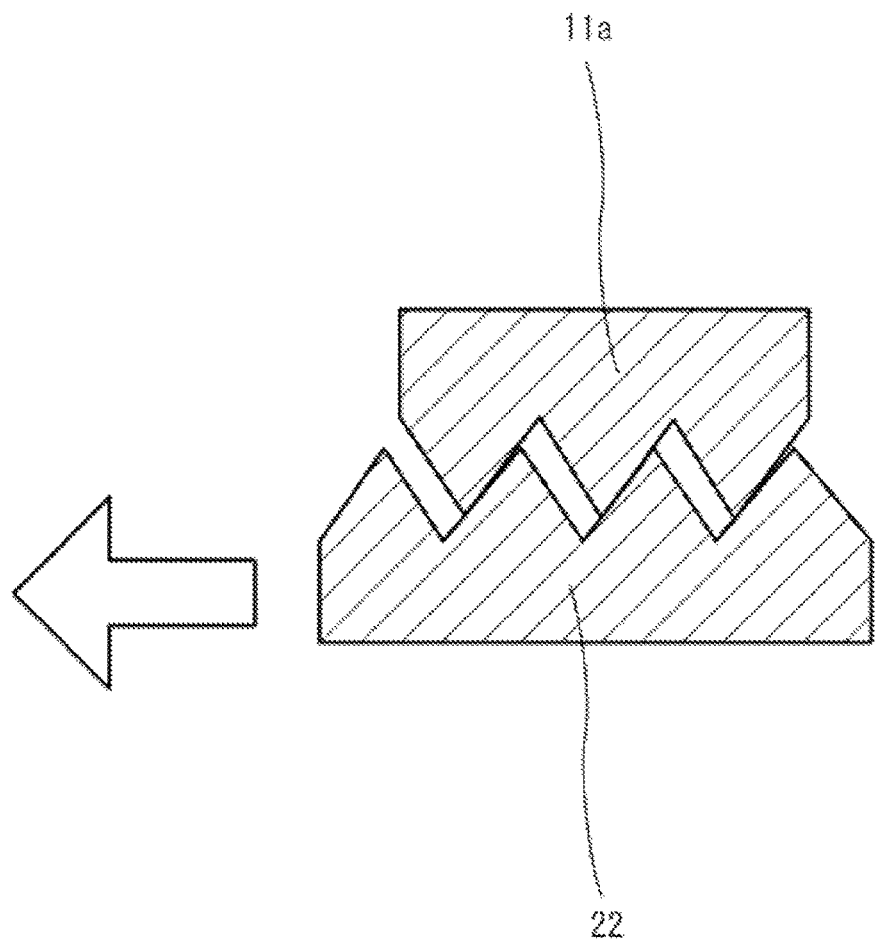
FIG. 4B is a partial cross-sectional diagram of an imaging device according to the example.

The coil spring 50 is fitted into the cylinder portion 21 of the lens barrel 20, where the end portion 51 on the front side thereof is in contact with the ring-shaped flange portion 25 of the lens barrel 20, and the end portion 52 on the back side thereof is in contact with the front face 12 of the base member 10. Moreover, the coil spring 50 is compressed through the insertion of the lens barrel 20 into the through hole 11 of the base member 10, so that the lens barrel 20 is biased in the direction away from the base member 10 along the optical axis L. As illustrated in FIG. 4B, when the lens barrel 20 is biased in the direction away from the base member 10 along the optical axis L (referencing the arrow in FIG. 4B), the ridge portions of the male threaded portion 22 of the lens barrel 20 are pressed in a state wherein they make facial contact with the trough portions of the female threaded portion 11a of the base member 10.

As illustrated in FIG. 1, FIG. 2, and FIG. 4A, the screw 70 is provided with a shaft portion 71 and a head portion 72. The outer diameter of the shaft portion 71 is smaller than the inner diameter of the through holes 42 of the securing plate 40 and the inner diameter of the through holes 81 of the circuit board 80. Moreover, the outer diameter of the head portion 72 is larger than the inner diameter of the through holes 42 in the securing plate 40 and the inner diameter of the through holes 81 of the circuit board 80. Through this, the securing plate 40 and the circuit board 80 are able to move, relative to the base member 10, through the shaft portions 71 of the screws 70 moving within the through holes 42 of the securing plate 40 and within the through holes 81 of the circuit board 80.

In this way, the screws 70 are screwed into the screw holes 16 of the base member 10, in a state wherein they are inserted through the through holes 42 of the securing plate 40 and through the through holes 81 of the circuit board 80, to prevent the securing plate 40 from coming off of the base member 10 if the adhesive agent 91 that secures the securing plate 40 to the base member 10 were to come off.

The method for manufacturing the imaging device 1000 according to the present example will be explained next. Here the explanation will be primarily regarding a centering adjusting step for adjusting the optical axis of the lens group 1 using a centering adjusting instrument, and a bonding step for securing the securing plate 40 to the base member 10 through the adhesive agent 91. First the lens barrel 20 wherein a lens group 1 is secured to the inside of the cylinder portion 21, so that the axis S2 of the cylinder portion 21 is coincident with the optical axis L of the lens group 1, and an assembly wherein the circuit board 80, whereon the imaging element 30 is mounted, and the securing plate 40 are combined together in a single unit, are prepared.

Following this, the coil spring 50 is fitted into the cylinder portion 21 of the lens barrel 20. The male threaded portion 22 of the lens barrel 20, into which the coil spring 50 is fitted, is then screwed together with the female threaded portion 11a that is formed on the inner peripheral surface of the through hole 11 of the base member 10, and screwed in by a prescribed amount. In this case, the securing plate 40, as illustrated in FIG. 5, is chucked by the gripping member T, and held in a state in contact with the back face 14 of the base member 10.

Thereafter, the focus of the imaging device 1000 is adjusted through adjusting the amount to which the lens barrel 20 is screwed in, while the captured images that are imaged by the imaging element 30 through the lens group 1 are checked.

The position of the imaging element 30 is adjusted through sliding, as appropriate, the securing plate 40, which is chucked by the gripping member T while remaining in contact with the back face 14 of the base member 10. Here the position of the imaging element 30 is adjusted so that the optical axis L of the lens group 1 will pass through the center of the imaging element 30.

Having the securing plate 40 be in contact with the back face 14 of the base member 10 in this way enables prevention a gap from occurring between the securing plate 40 and the back face 14 of the base member 10. Moreover, in the bonding step, described below, wherein the adhesive agent 91 is filled, having no gap between the securing plate 40 and the back face 14 of the base member 10 prevents the adhesive agent 91 from leaking out from the chucking portion 43 of the securing plate 40 into a gap between the securing plate 40 and the base member 10. This makes it possible to prevent a shift in the position of the imaging element 30 that would be caused by expansion or shrinkage of the adhesive agent 91 that has leaked between the securing plate 40 and the back face 14 of the base member 10, for example. Preventing a shift in the position of the imaging element 30 in this way enables prevention of a negative effect on the resolution of the images or video taken using the imaging device 1000.

Next, after removal of the imaging device 1000 from the centering adjusting instrument, the adhesive agent 91 is filled into the chucking portion 43 of the securing plate 40 and cured, to secure the securing plate 40 to the base member 10, as illustrated in FIG. 4A. In this case, the lens barrel 20 is secured to the base member 10 through the filling and curing of the adhesive agent between the cylinder portion 21 of the lens barrel 20 and the through hole 11 of the base member 10 as well. Note that an ultraviolet radiation-curable adhesive agent or a naturally dryable adhesive agent may be employed for the adhesive agent 91.

Thereafter, the screws 70 are inserted through the through holes 81 of the circuit board 80 and through the through holes 42 of the securing plate 40 and screwed into the screw holes 16 of the base member 10, to secure the circuit board 80 and the securing plate 40 to the base member 10.

As explained above, in the imaging device 1000 according to the present example, the coil spring 50 is attached to the lens barrel 20, and in a state wherein the lens barrel 20 is inserted into the through hole 11 of the base member 10, the lens barrel 20 is biased in the direction away from the base member 10 along the axis of the through hole 11. Here the lens barrel 20 has a male threaded portion 22 that is formed on the outer peripheral surface of the lens barrel 20. Moreover, the base member 10 has a female threaded portion 11a, formed on the inner peripheral surface of the through hole 11, for screwing together with the male threaded portion 22. Moreover, the coil spring 50, as illustrated in FIG. 4B, presses the lens barrel 20 to produce a state wherein the ridge portions of the male threaded portion 22 of the lens barrel 20 are pressed against the trough portions of the female threaded portions 11a of the base member 10. When not secured to the base member 10 by an adhesive agent, the lens barrel 20 can be moved in the direction of the optical axis L of the lens group 1 while subjected to the biasing force of the coil spring 50.

Through this, when performing the focus adjustment, the biasing force of the coil spring 50 is able to prevent play of the lens barrel 20, even if there is backlash between the male threaded portion 22 and the female threaded portion 11a. As a result, the positional adjustment in the direction of the optical axis L of the lens group 1 of the lens barrel 20 is performed accurately. Moreover, when the lens barrel 20 is secured to the lens barrel retaining portion 18 of the base member 10 through the adhesive agent 91, the lens barrel 20 is biased in the direction away from the base member 10 along the axis of the through hole 11, thus preventing any misalignment of the lens barrel 20. The optical characteristics of the imaging device 1000 are set to the desired optical characteristics through preventing, in this way, the production of misalignment of the lens barrel 20.

Moreover, in the imaging device 1000 according to the present example, when the securing plate 40 to which the imaging element 30 is secured is not secured by the adhesive agent 91 to the base member 10, it is provisionally secured to the base member 10 in a state wherein movement is possible in the direction that is perpendicular to the optical axis L of the lens group 1. Here the base member 10 is perpendicular to the axis of the through hole 11, and has a back face 14 that is in facial contact with one face, in the thickness direction, of the securing plate 40, where the securing plate 40 can move in the form of sliding along the back face 14 of the base member 10. This enables the optical axis of the lens group 1 to be adjusted so as to pass through the center of the imaging surface 30a of the imaging element 30, through movement of the securing plate 40 in the direction that is perpendicular to the optical axis L of the lens group 1, and in the direction of rotation around the optical axis L.

Additionally, the base member 10 according to the present example has a front guiding portion 11b and a back guiding portion 11c for guiding the lens barrel 20 so that the axis of the lens barrel 20 will be coincident with the axis of the through hole 11. Moreover, the lens barrel 20 has a front guiding portion 23 and a back guiding portion 24 for guiding the front guiding portion 11b and the back guiding portion 11c.

Through this, when the lens barrel 20, to which the lens group 1 is secured in advance in such a way that the optical axis L of the lens group 1 is coincident with the axis of the lens barrel 20, is attached to the base member 10, the front guiding portion 23 and the back guiding portion 24 of the lens barrel 20 are guided by the front guiding portion 11b and the back guiding portion 11c of the base member 10. Given this, the lens barrel 20 is disposed in a position so that the axis of the lens barrel 20, that is, the optical axis L of the lens group 1, will be coincident with the axis of the through hole 11 of the base member 10. Consequently, this can prevent the axis of the lens barrel 20, that is, the optical axis L of the lens group 1, from becoming shifted or tilted relative to the axis of the through hole 11 of the base member 10.

Moreover, the front guiding portion 11b and the back guiding portion 11c in the present example are formed on both sides of the female threaded portion 11a on the inner peripheral surface of the through hole 11 of the base member 10. Moreover, front guiding portions 23 and back guiding portions 24 are formed on both sides of the male threaded portion 22 on the outer peripheral surface of the lens barrel 20.

Through this, this enables prevention of shifting or tilting of the optical axis L of the lens group 1, relative to the axis of the through hole 11 of the base member 10, more reliably than in a structure wherein, for example, a guiding portion and a guided portion are provided one each.

Moreover, the front guiding portions 11b and back guiding portions 11c in the present example are formed so as to make contact with the front guiding portions 23 and the back guiding portions 24 around the entire periphery. This enables prevention of shifting or tilting of the optical axis L of the lens group 1 relative to the axis of the through hole 11 of the base member 10.

Moreover, the imaging device 1000 according to the present example is equipped with a coil spring 50. With this structure, the coil spring 50 is disposed in a state wherein it is compressed between the ring-shaped flange portion 25 of the lens barrel 20 and the front face 12 of the base member 10, through merely attaching the lens barrel 20 to the base member 10 in a state wherein the coil spring 50 has been fitted into the lens barrel 20.

Moreover, the securing plate 40 according to the present example is secured to the base member 10 by an adhesive agent 91. This enables a reduction in the external noises that act on the securing plate 40 when the securing plate 40 is secured to the base member 10, when compared to a structure wherein, for example, the securing plate 40 is secured to the base member 10 through the use of screws, or the like, enabling prevention of misalignment of the securing plate 40 when the securing plate 40 is secured to the base member 10.

Moreover, the imaging device 1000 according to the present example comprises screws 70 that are long and thin, and that are secured to the base member in a state wherein they protrude to the back face 14 side (the imaging element 30 side) of the base member 10. Given this, the securing plate 40 has through holes 42 through which the screws 70 pass, in the direction of thickness of the securing plate 40, at positions corresponding to the screws 70 that are secured to the base member 10. Through this, the screws 70 can prevent the securing plate 40, and the circuit board 80, on which the imaging element 30 is mounted, from coming off of the base member 10 even if the adhesive agent 91 were to peel off.

Moreover, notch portions 43a (adhesive agent filling portions) that have wedge shapes in the plan view, for filling with the adhesive agent 91, are provided in the chucking portions 43 of the securing plate 40 according to the present example. Through this, the adhesive agent can be filled in an appropriate position when the adhesive agent is filled between the securing plate 40 and the base member 10.

Moreover, in the centering adjusting step in the imaging device 1000 according to the present example, the position of the securing plate 40 can be adjusted in a state wherein the tip end portions of the gripping members T are inserted into the notch portions 43a of the chucking portions 43 of the securing plate 40, as described above. In this case, insertion of the tip end portions of the gripping members T is facilitated through the notch portions 43a being formed in what, in the plan view, are ridge shapes. The adjustment of the position of the securing plate 40 using the gripping members T is facilitated through facilitating, in this way, the insertion of the tip end portions of the gripping members T into the notch portions 43a.

Example 2

Figure 8:
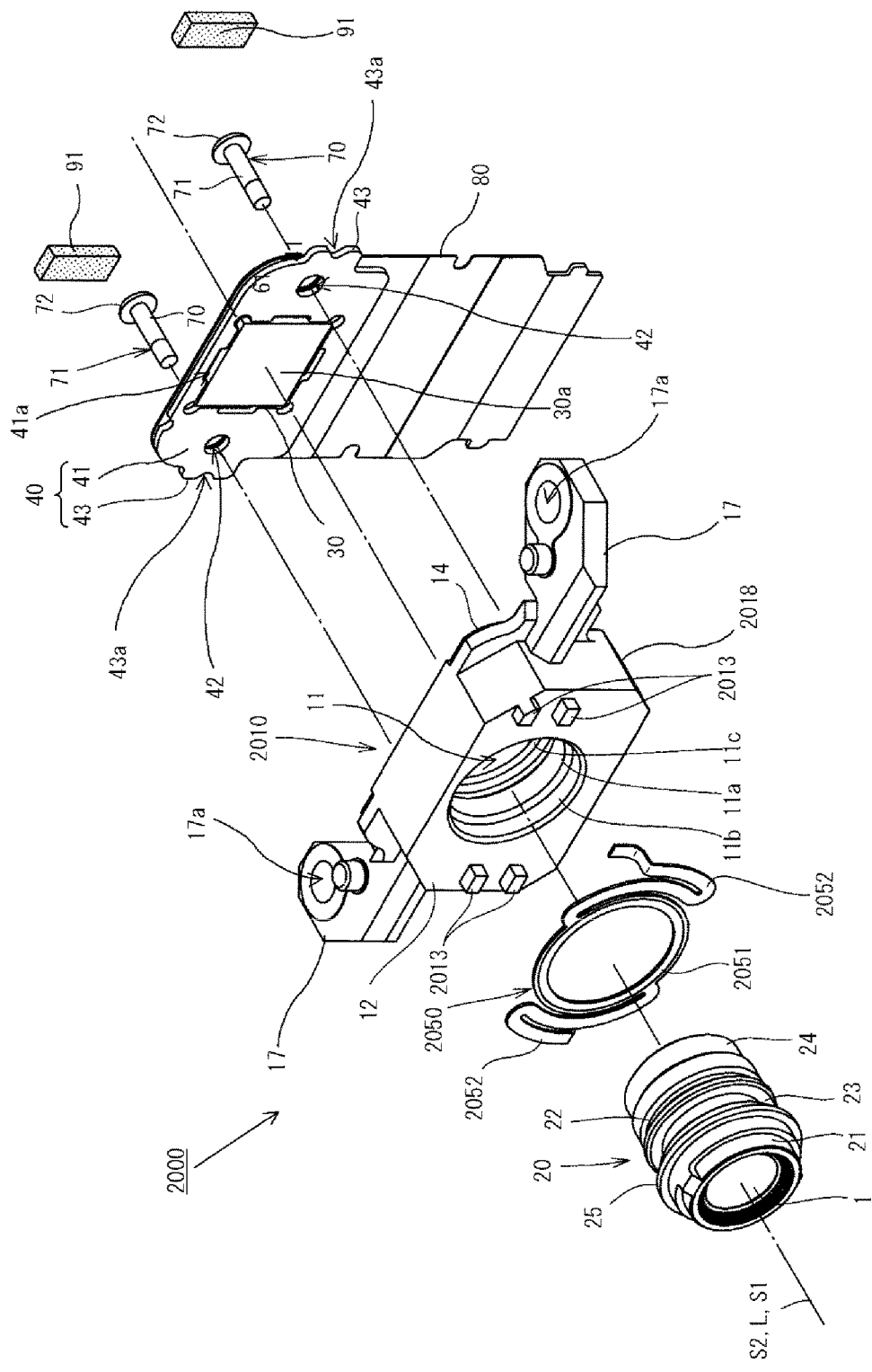
FIG. 8 is an assembly perspective diagram of an imaging device according to another example according to the present invention.
Figure 9:
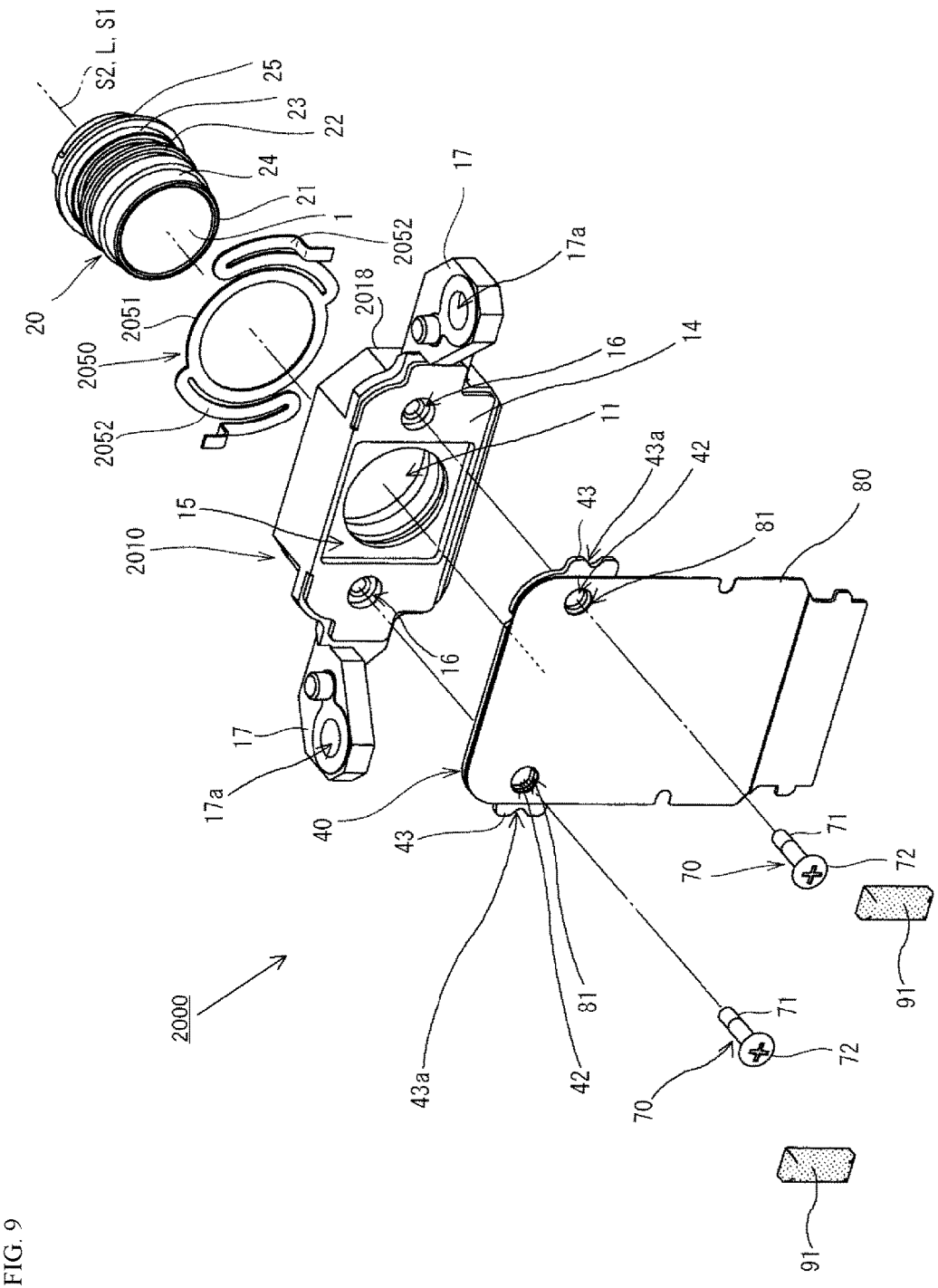
FIG. 9 is an assembly perspective diagram of an imaging device according to the other example.
Figure 10:
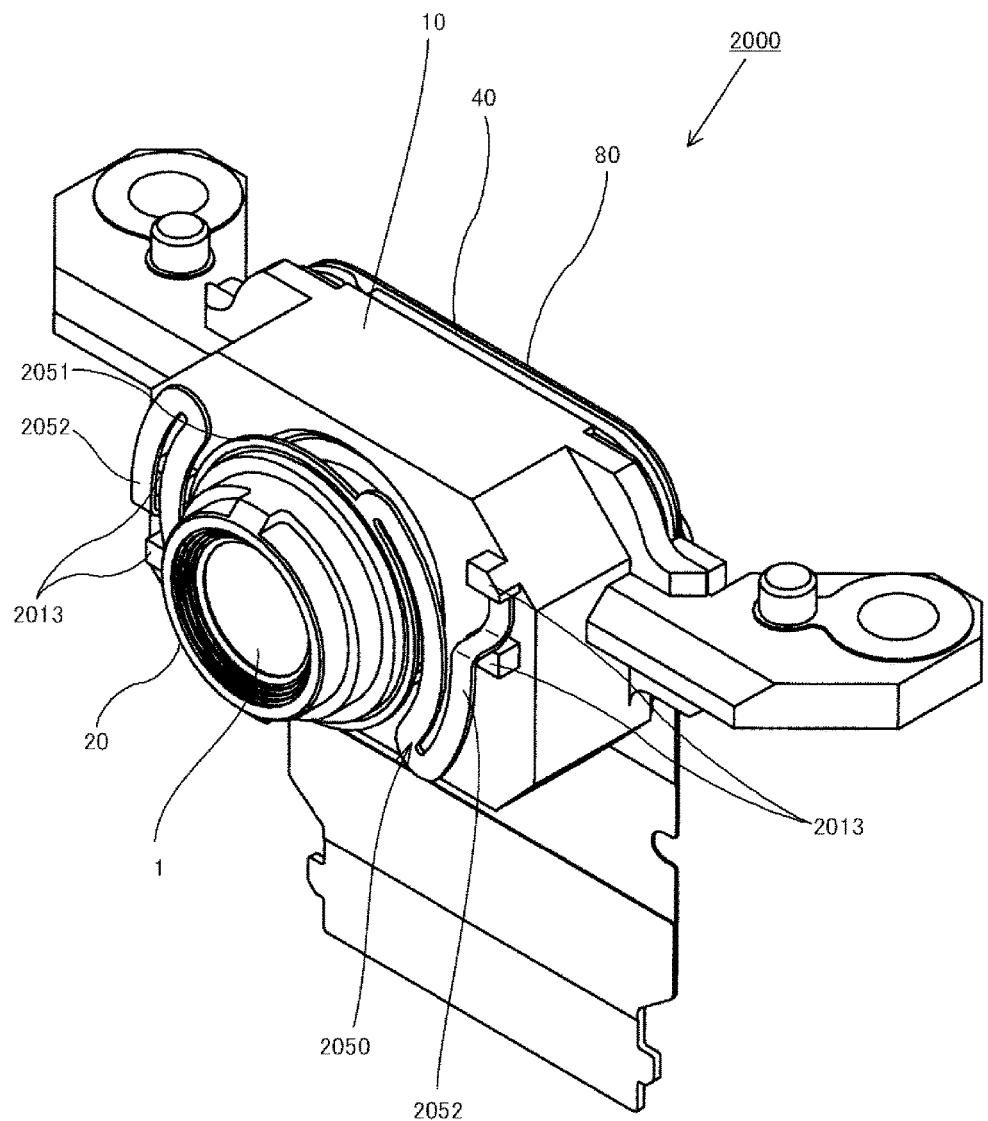
FIG. 10 is a perspective diagram of an imaging device according to the other example.

In the imaging device 2000 according to the present example, a leaf spring 2050 is provided instead of the coil spring 50 of the imaging device 1000 that was explained in the previous example. As illustrated in FIG. 8 and FIG. 9, the imaging device 2000 comprises a lens group 1, a lens barrel 20 for holding the lens group 1, a base member (a lens barrel retaining member) 2010, a leaf spring (a pressing member) 2050, an imaging element 30, a securing plate 40, a circuit board 80, and screws 70. The imaging device 1000 has external appearance as illustrated in FIG. 10. Note that structures that are identical to those in the previous example are assigned reference symbols that are the same as those in FIG. 1 through FIG. 3.

Figure 11:
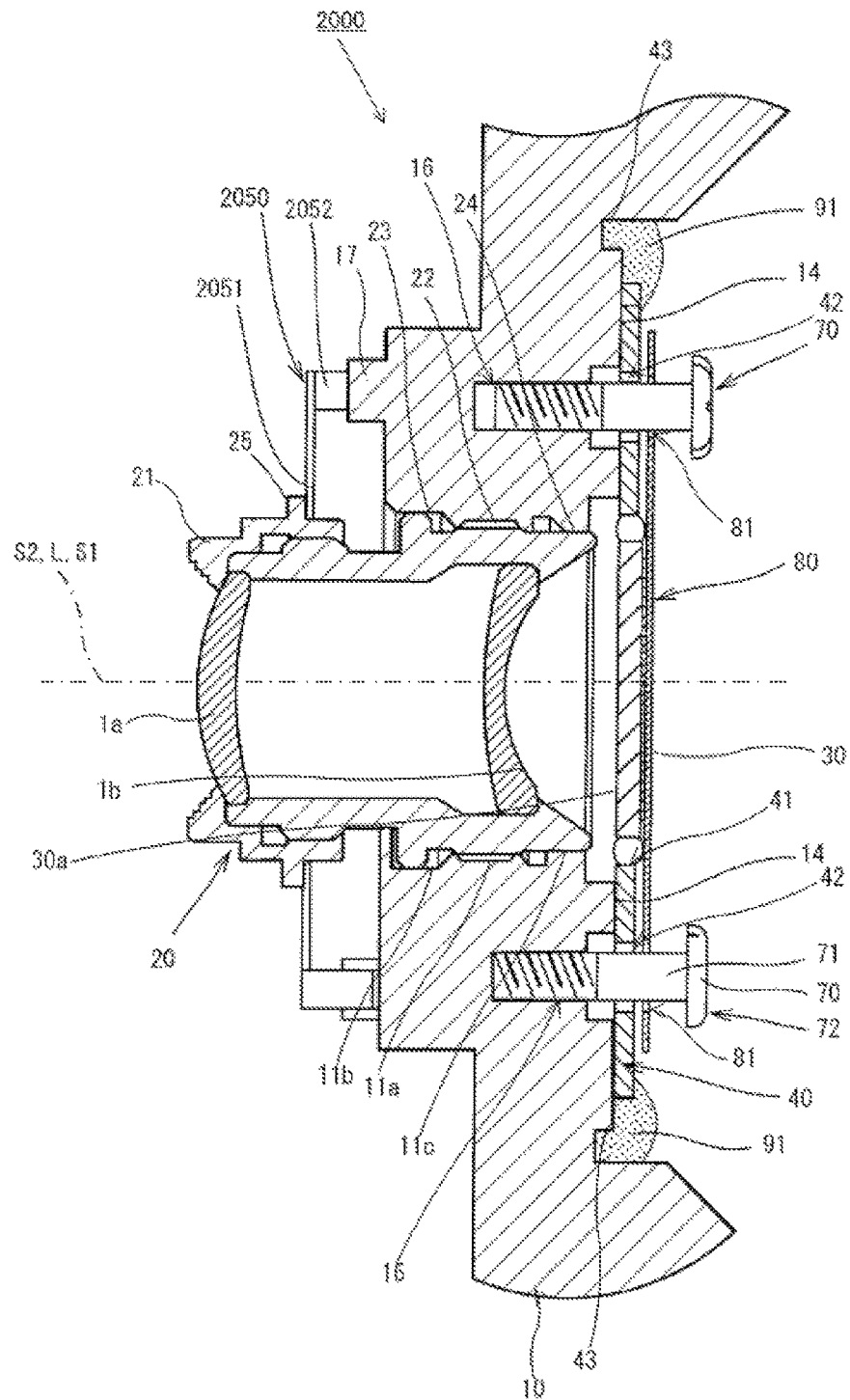
FIG. 11 is a cross-sectional view of an imaging device according to the other example.

The base member 2010 is formed from a metal, a resin material, or the like. The base member 2010, as illustrated in FIG. 8, FIG. 9, and FIG. 11, comprises a flat rectangular lens barrel retaining portion 2018 for holding the lens barrel 20, and two attaching portions 17.

In the outer peripheral portion of the through hole (first through hole) 11 in the front face 12 of the lens barrel retaining portion 2018, pairs of protruding portions 2013 protrude at each of two locations. Given this, portions of the leaf spring 2050 is held between the ring-shaped flange portion 25 of the lens barrel 20 and the front face 12 of the lens barrel retaining portion 2018 in a state wherein portions thereof are fitted between the protruding portions 2013. Portions of the leaf spring 2050 being fitted between the pairs of protruding portions 2013 constrains rotation of the leaf spring 2050 around the optical axis L.

The leaf spring 2050, as illustrated in FIG. 8 and FIG. 9, comprises a ring-shaped portion 2051 and two bent leg portions 2052 that extend outward from two opposing locations on either side of the center of the ring-shaped portion 2051. The ring-shaped portion 2051 is fitted into the cylinder portion 21 in a state wherein it contacts the ring-shaped flange portion 25 of the lens barrel 20. The ring-shaped portion 2051 is disposed so as to be able to rotate around the lens barrel 20. Given this, with the lens barrel 20 in a state wherein it is held on the lens barrel retaining portion 2018 of the base member 2010, the respective tip end portions of the two bent leg portions 2052 are fitted between the pairs of protruding portions 2013 of the base member 2010. The bent leg portions 2052 of the leaf spring 2050 elastically deform as the lens barrel 20 is screwed into the through hole 11 of the lens barrel retaining portion 2018. Accompanying this, the lens barrel 20 is biased in the direction away from the base member 2010 along the optical axis L.

The method for manufacturing the imaging device 2000 according to the present example is essentially the same as the method for manufacturing the imaging device 1000 that was explained in the first example, with a difference in a point in that, in the centering adjusting step, the leaf spring 2050, instead of the coil spring 50, is fitted into the cylinder portion 21 of the lens barrel 20.

As explained above, in the imaging device 2000 according to the present example, the lens barrel 20 is biased, by the leaf spring 2050, in the direction away from the base member 2010 along the optical axis L of the lens group 1. This can prevent rattle of the lens barrel 20 in the direction of the optical axis L, even if there were a gap or backlash produced due to tolerance errors in the dimensions between the male threaded portion 22 of the lens barrel 20 and the female threaded portion 11a of the base member 10. As a result, the focus of the imaging device 2000 can be adjusted accurately, enabling, by extension, the desired optical characteristics to be produced reliably in the imaging device 2000.

Moreover, the ring-shaped portion 2051 of the leaf spring 2050 is disposed so as to be able to rotate around the lens barrel 20, and, as a result, no twisting force is produced on the leaf spring 2050 when the lens barrel 20 is screwed into the through hole 11 of the base member 10. As a result, enables prevention of the occurrence of a problem with the positioning of the lens barrel 20 that could result from the twisting force of the leaf spring 2050, enabling the focus of the imaging device 2000 to be adjusted accurately.

Example 3

Figure 12:
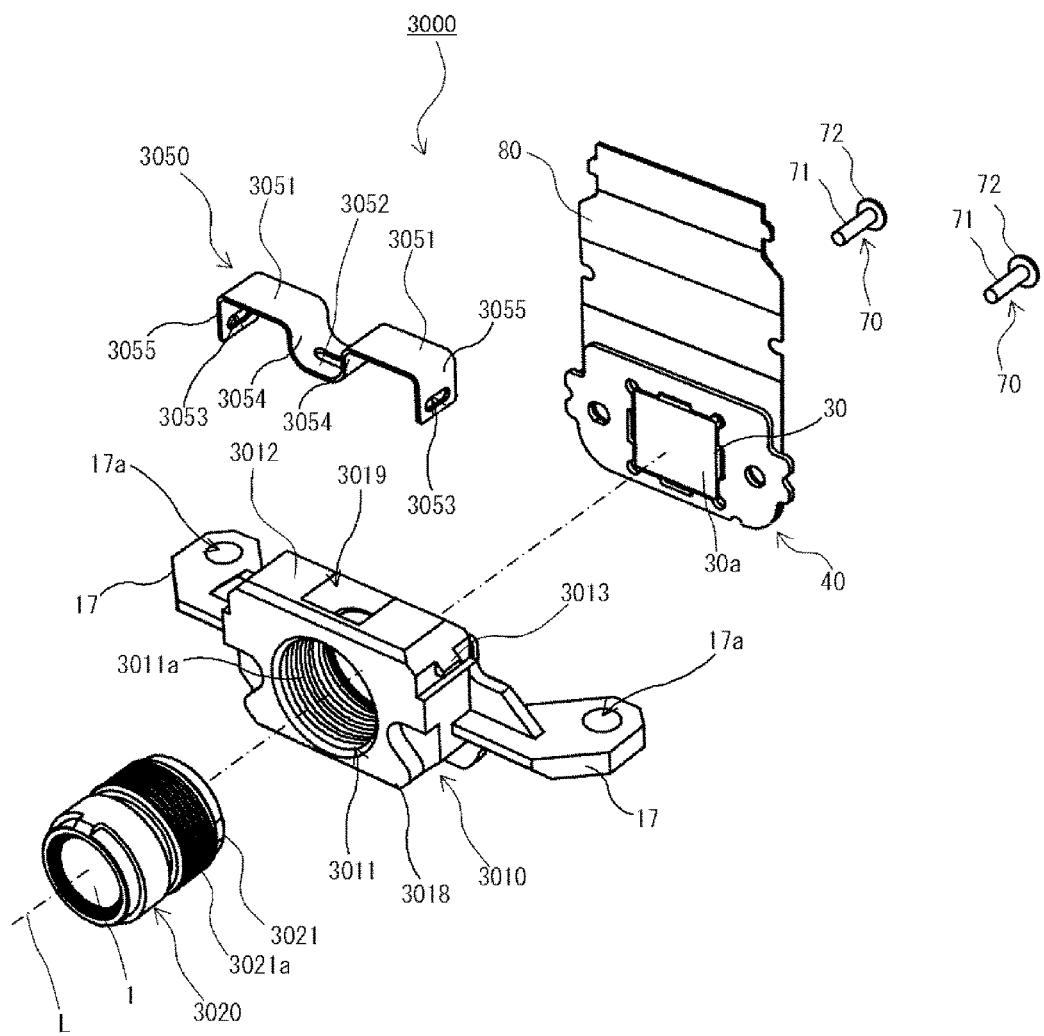
FIG. 12 is an assembly perspective diagram of an imaging device according to a further example according to the present invention.
Figure 13:
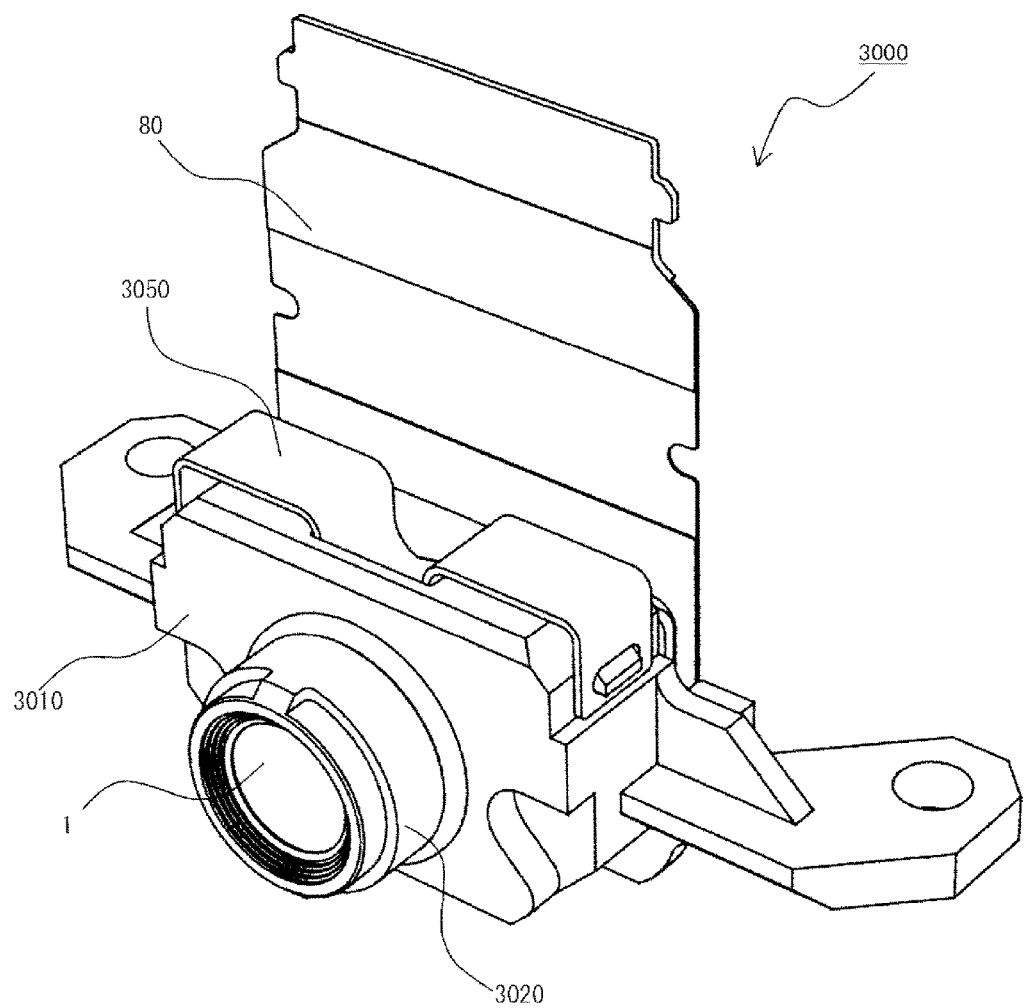
FIG. 13 is a perspective diagram of an imaging device according to the further example.

The imaging device according to the present example is a device for capturing an image of a photographic subject that is focused through a lens group onto an imaging surface of an imaging element, and, in particular, applies to a vehicle-mounted camera that is installed in a vehicle. As illustrated in FIG. 12, the imaging device 3000 according to the present example comprises a lens group 1, a lens barrel 3020 for holding the lens group 1, a base member 3010, a leaf spring (a pressing member) 3050, an imaging element 30, a securing plate 40, a circuit board 80, and screws 70. As appropriate, in the below, the explanations in FIG. 12 will define the direction toward the circuit board 80 along the optical axis L of the lens group 1 as toward the "back," and the opposite direction along the optical axis L as toward the "front." The imaging device 3000 has external appearance as illustrated in FIG. 13. Note that in FIG. 12 and FIG. 13, structures that are identical to those in the previous example are assigned reference symbols that are the same as those in FIG. 1 through FIG. 3.

The lens barrel 3020 is structured from a cylinder portion 3021, which is formed in an essentially cylindrical shape and has a lens group 1 secured in the interior thereof, with a male threaded portion 3021a formed on the outer peripheral surface thereof.

The base member 3010, as illustrated in FIG. 12, has a flat box-shaped lens barrel retaining portion 3018 for holding the lens barrel 3020, and two attaching portions 17 that are secured to the vehicle, or the like, when the imaging device 3000 is attached to a vehicle, or the like. This base member 3010 is formed from a metal, a resin material, or the like.

The lens barrel retaining portion 3018 has a through hole (a third through hole) 3011 that passes therethrough in the direction of thickness, screw holes (not shown), provided in the back face thereof, into which are screwed screws 70 for preventing the securing plate 40 from coming off, and a connecting hole (a first connecting hole) 3019 that communicates from the side face (the outside face) 3012 of the base member 3010 to the through hole 3011. A female threaded portion 3011a is formed in of the inner peripheral surface of the through hole 3011. The female threaded portion 3011a can screw together with the male threaded portion 3021a of the lens barrel 3020.

In a state wherein the male threaded portion 3021a of the lens barrel 3020 is screwed into the female threaded portion that is formed in the inner peripheral surface of the through hole 3011, the position of the lens barrel 3020 relative to the base member 3010 can be adjusted through rotating the lens barrel 3020 around the axes thereof.

The back face 3014 of the lens barrel retaining portion 3018 structures a flat face that is perpendicular to the axis of the through hole 3011, that is, perpendicular to the optical axis L of the lens group 1 that is secured within the lens barrel 3020 that is inserted into the through hole 3011. The front face of the securing plate 40 makes facial contact with the back face 3014 of the lens barrel retaining portion 3018. Additionally, the securing plate 40 is slid over the back face 3014 of the lens barrel retaining portion 3018 to carry out positioning within the plane that is perpendicular to the optical axis L of the securing plate 40.

The connecting hole 3019 extends in a direction that is perpendicular to the axis of the through hole 3011, to connect to the interior of the through hole 3011. In a state wherein the lens barrel 3020 is inserted into the through hole 3011 of the base member 3010, the outer peripheral surface of the lens barrel 3020 is exposed on the side face 3012 of the base member 3010 through the connecting hole 3019. Moreover, an engaging protruding portion 3013 for engaging the leaf spring 3050 to the base member 3010 is provided on the lens barrel retaining portion 3018.

Figure 14:
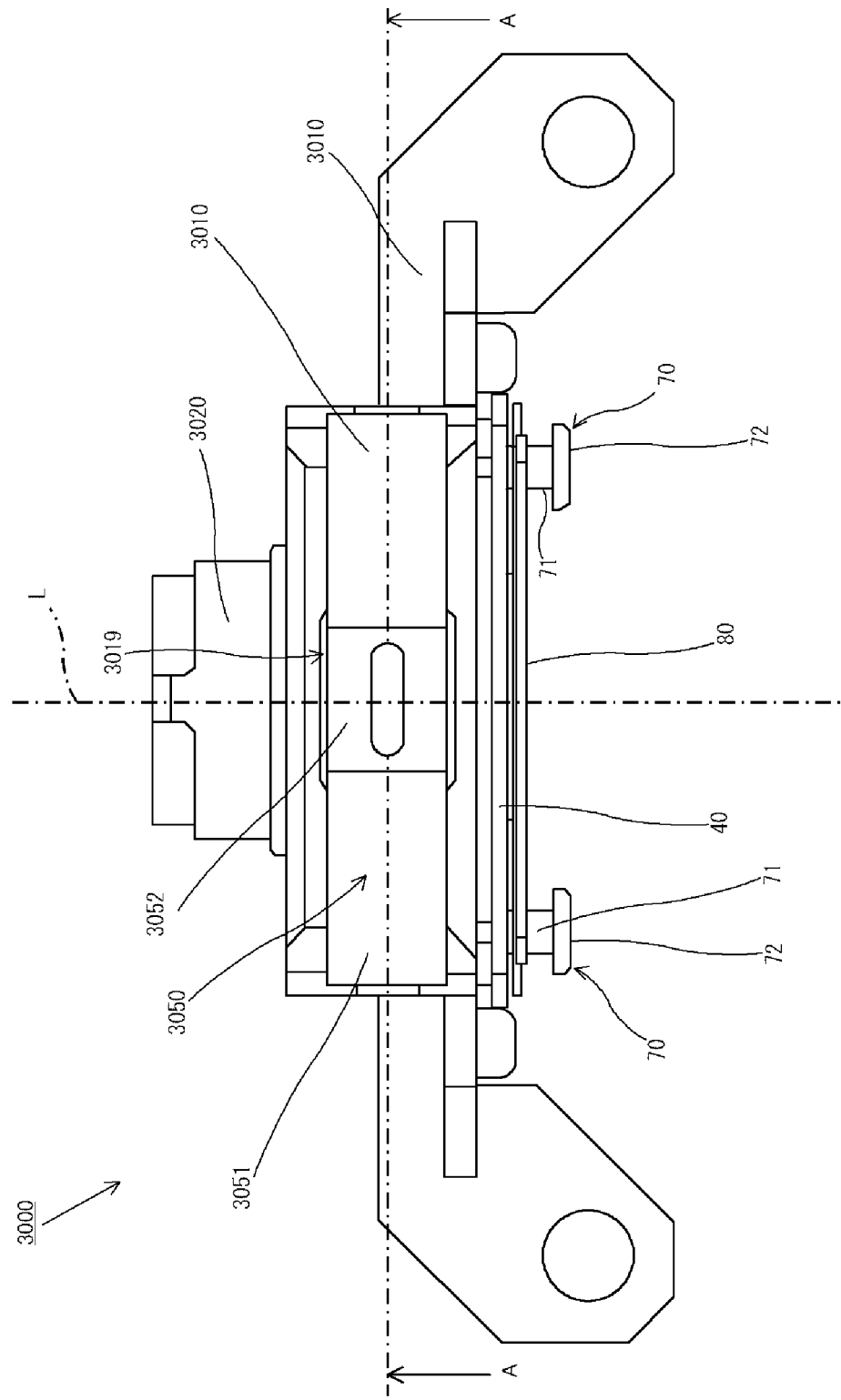
FIG. 14 is a plan view of an imaging device according to the further example.

The leaf spring 3050 has a rectangular plate-shaped main piece 3052, two standing pieces 3054 that stand in the thickness direction, made from pieces that face the main piece 3052, and elastic portions 3051, able to deform elastically, that extend in directions away from each other from the tip end portions of the respective standing pieces 3054. Moreover, the leaf spring 3050 has extending pieces 3055 that extend toward the main piece 3052 side from the end portions of the elastic portions 3051 on the sides that are opposite from those of the standing pieces 3054. The main piece 3052 contacts the outer peripheral surface of the lens barrel 3020 in a state wherein the leaf spring 3050 is attached to the base member 3010 together with the lens barrel 3020. The elastic portions 3051 are able to perform elastically in the thickness direction of the main piece 3052. The leaf spring 3050 is formed through bending a metal plate that is, in the plan view, a long thin rectangle. This leaf spring 3050, as illustrated in FIG. 14, is attached to the base member 3010 in a state wherein the main piece 3052 is fitted into the connecting hole 3019 of the base member 3010.

Figure 15:
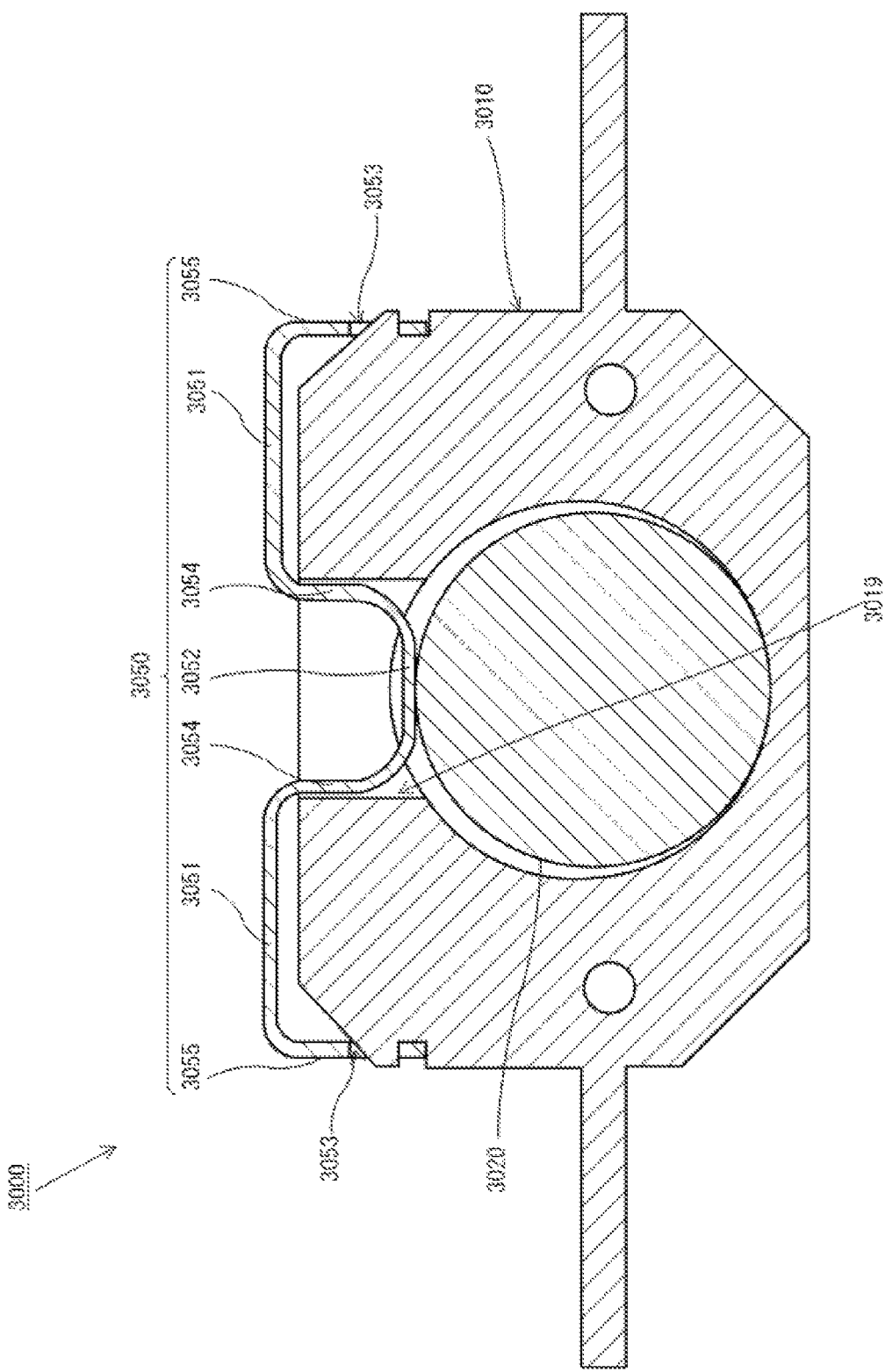
FIG. 15 is a cross-sectional arrow view at the section A-A in FIG. 14 of the imaging device of the further example.

Engaging holes 3053, for engaging the engaging protruding portions 3013 of the base member 3010, are formed in the respective extending pieces 3055. The leaf spring 3050, as illustrated in FIG. 15, is attached to the base member 3010 through engaging the engaging holes 3053 of the extending pieces 3055 onto the engaging protruding portions 3013 of the base member 3010. Note that the lens group 1 is omitted from FIG. 15. In a state wherein the lens barrel 3020 is not attached to the base member 3010, the state is one wherein the main piece 3052 of the leaf spring 3050 protrudes further to the inside of the through hole 3011 than the inner peripheral surface of the through hole 3011 of the base member 3010. Moreover, the elastic portion 3051 is able to deform in the thickness direction thereof in a state wherein the base member 3010 is away from the side face 3012.

Figure 16A:
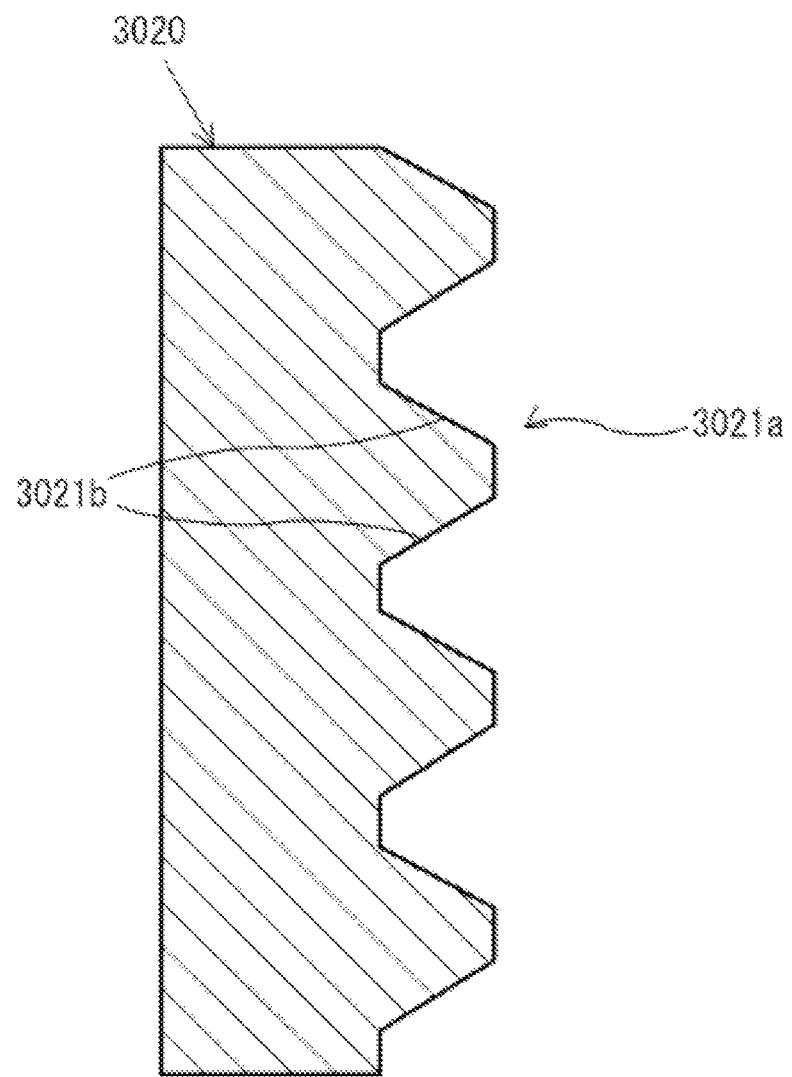
FIG. 16A is a partial cross-sectional diagram of the lens barrel in the further example.
Figure 16B:
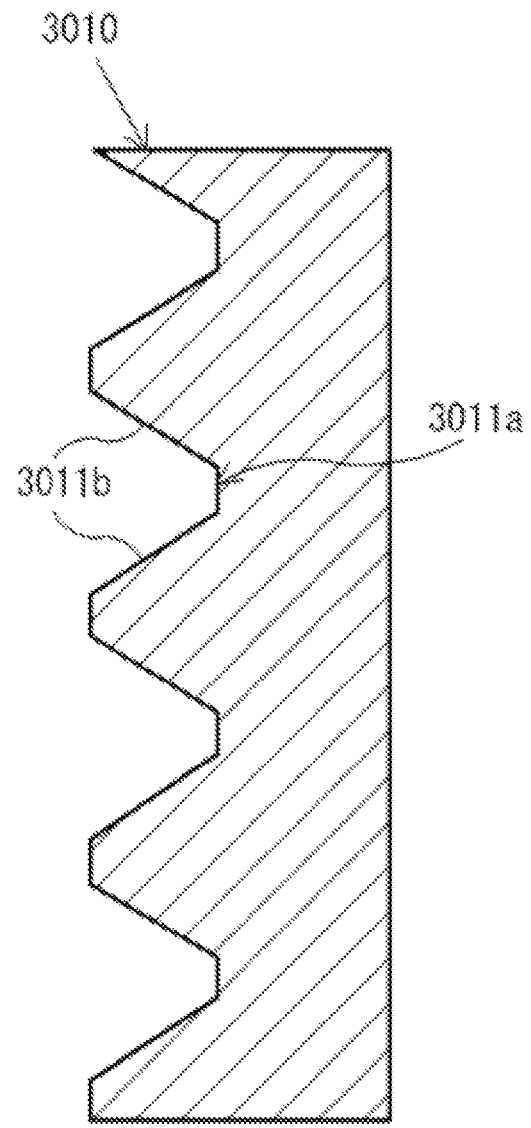
FIG. 16B is a partial cross-sectional diagram of the base member in the further example.
Figure 16C:
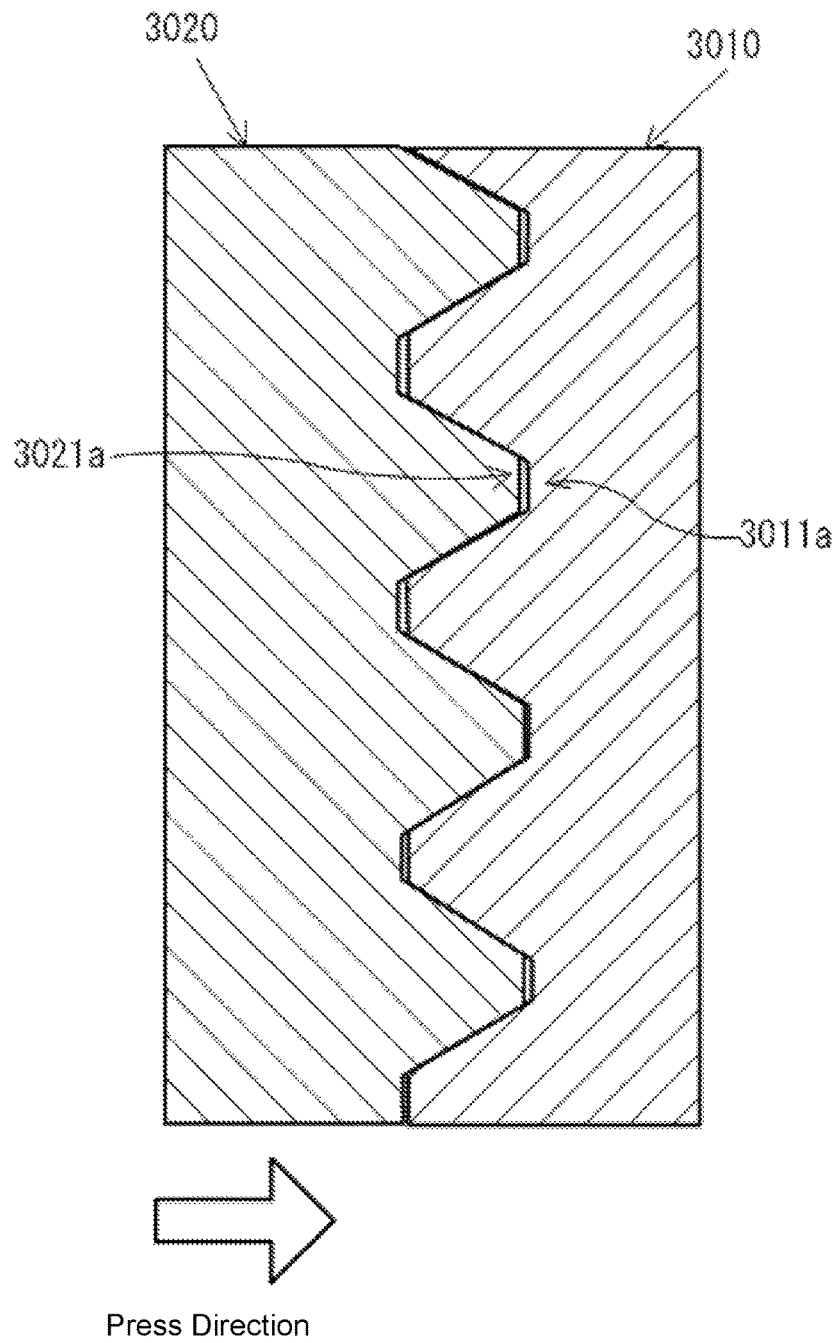
FIG. 16C is a partial cross-sectional view of the lens barrel and base member in a state wherein the lens barrel is attached to the base member in the further example.

In a state wherein the lens barrel 3020 is inserted into the through hole 3011 of the base member 3010 and the leaf spring 3050 is attached to the base member 3010, the lens barrel 3020 is biased, by the leaf spring 3050, in the direction of the axis of the through hole 3011, that is, in the direction that is perpendicular to the optical axis L of the lens group 1 that is secured to the lens barrel 3020 that is attached to the base member 3010. Through this, as illustrated in FIG. 15, the outer peripheral surface of the lens barrel 3020 will contact the opposite side of the inner peripheral surface of the through hole 3011 of the base member 3010 from the side of the connecting hole 3019. Here the male threaded portion 3021a of the lens barrel 3020, as illustrated in FIG. 16A, has inclined surfaces 3021b that structure the ridge portions thereof, and the female threaded portion of the base member 3010, as illustrated in FIG. 16B, has inclined surfaces 3011b that structure the trough portions. Given this, at the position of contact of the outer peripheral surface of the lens barrel 3020 with the inner peripheral surface of the through hole 3011 of the base member 3010, as illustrated in FIG. 16C, a state is produced wherein the inclined surfaces 3021b of the male threaded portion 3021a make facial contact with the inclined surfaces 3011b of the female threaded portion 3011a of the base member 3010. This is able to prevent the occurrence of play in the lens barrel 3020 in a state wherein the lens barrel 3020 is attached to the base member 3010.

The method for manufacturing the imaging device 3000 according to the present example will be explained next. Here the explanation will be primarily regarding a centering adjusting step for adjusting the optical axis of the lens group 1 using a centering adjusting instrument, or the like, and a bonding step for securing the securing plate 40 to the base member 3010 through the adhesive agent 91. First the lens barrel 3020, with a lens group 1 secured therein, and an assembly wherein the circuit board 80, whereon the imaging element 30 is mounted, and the securing plate 40 are combined together in a single unit, are prepared. Here the imaging element 30 is connected electrically to the circuit board 80.

The male threaded portion 3021a of the lens barrel 3020 is then screwed together with the female threaded portion 11a that is formed on the inner peripheral surface of the through hole 3011 of the base member 3010, and screwed in by a prescribed amount. This leaf spring 3050 is attached to the base member 3010 in a state wherein the main piece 3052 of the leaf spring 3050 is fitted into the connecting hole 3019 of the barrel retaining portion 3018 of the base member 3010. At this time, the engaging holes 3053 of the leaf spring 3050 are caused to engage with the engaging protruding portions 3013 of the base member 3010. Thereafter, the base member 3010, the securing plate 40, and the circuit board 80 are held in a state wherein the front face of the securing plate 40 is in facial contact with the back face 3014 of the base member 3010.

Following this, the circuit board 80 is connected electrically to an image displaying device (not shown), and focusing of the imaging device 3000 is carried out while checking, on the image displaying device, the captured image of the photographic subject that is focused on the imaging surface 30a of the imaging element 30 through the lens group 1. The positional adjustment in the direction of the optical axis L of the lens group 1 of the lens barrel 3020 is carried out here. At this time, the lens barrel 3020 is pressed against the inner peripheral surface of the through hole 3011 of the base member 3010 by the leaf spring 3050.

Here the position of the imaging element 30 is adjusted so that the optical axis L of the lens group 1 will pass through the center of the imaging surface 30a of the imaging element 30, through sliding of the securing plate 40 along the back face 3014 of the base member 3010. Thereafter, the adhesive agent is used to secure the lens barrel 3020 to the lens barrel retaining portion 3018 of the base member 3010, and also to secure the securing plate 40 and the circuit board 80 to the back face 3014 of the base member 3010. Here an ultraviolet radiation-curable adhesive agent or a naturally dryable adhesive agent may be employed for the adhesive agent.

Finally, the screws 70 that have been inserted through the through holes 42 of the securing plate 40 are screwed into the screw holes of the base member 3010.

As explained above, in the imaging device 3000 according to the present example, the outer peripheral surface of the lens barrel 3020 is pressed against the inner peripheral surface of the through hole 3011 of the base member 3010 by the leaf spring 3050. In this case, as illustrated in FIG. 16C, at the place in the outer peripheral surface of the lens barrel 3020 that makes contact with the inner peripheral surface of the through hole 3011, a state will be produced wherein the inclined surfaces 3021b of the male threaded portion 3021a make facial contact with the inclined surfaces 3011b of the female threaded portion 3011a of the base member 3010. Through this, play in the lens barrel 3020, in the state wherein the lens barrel 3020 is attached to the base member 3010, is prevented, enabling the focus of the imaging device 3000 to be adjusted accurately. That is, because fine adjustments of the lens group 1 are possible in the direction of the optical axis L thereof, relative to the imaging element 30, the positioning accuracy of the lens group 1 can be improved. Moreover, when securing the lens barrel 3020 to the lens barrel retaining portion 3018 of the base member 3010 through the use of the adhesive agent, the outer peripheral surface of the lens barrel 3020 is pressed against the inner peripheral surface of the through hole 3011 of the base member 3010 by the leaf spring 3050, making it possible to prevent misalignment of the lens barrel 3020.

Moreover, in a state wherein the leaf spring 3050 is attached to the base member 3010, the face of the main piece 3052 of the leaf spring 3050 that makes contact with the lens barrel 3020 will be essentially parallel to the axis of the through hole 3011 of the base member 3010. Given this, in the state wherein the main piece 3052 of the leaf spring 3050 is in contact with the outer peripheral surface of the lens barrel 3020, the main piece 3052 of the leaf spring 3050 will be biased, by the elastic portion 3051, in a direction that is essentially perpendicular to the axis of the through hole 3011. This makes it possible to cause the optical axis L of the lens group 1, which is secured to the lens barrel 3020, to be parallel with the axis of the through hole 3011 of the base member 3010. That is, this enables prevention of the lens barrel 3020 being attached to the base member 3010 in a state wherein the optical axis L of the lens group 1 is shifted or tilted relative to the axis of the through hole 3011 of the base member 3010.

Example 4

Figure 17:
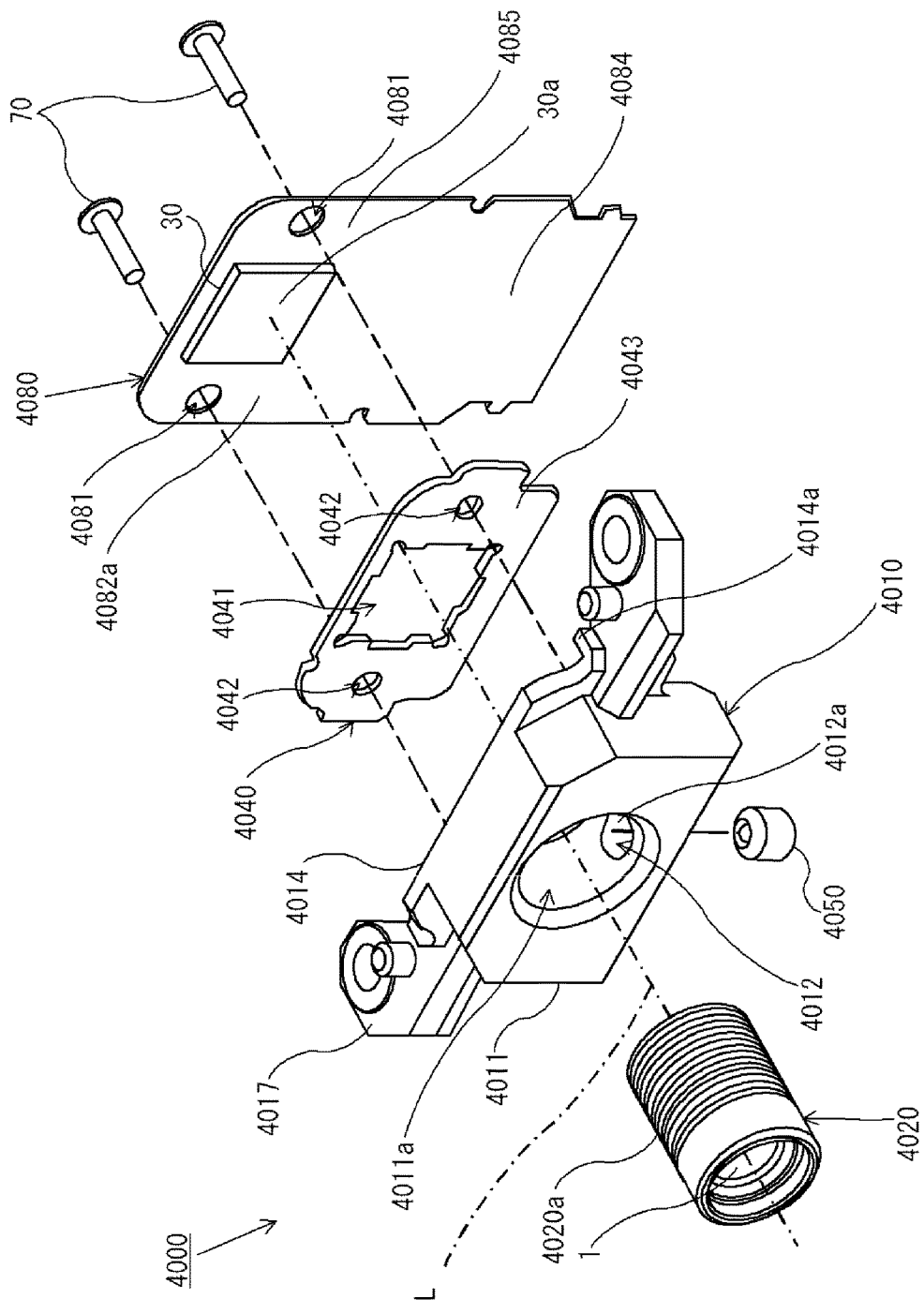
FIG. 17 is an assembly perspective diagram of an imaging device according to a yet another example according to the present invention.
Figure 18:
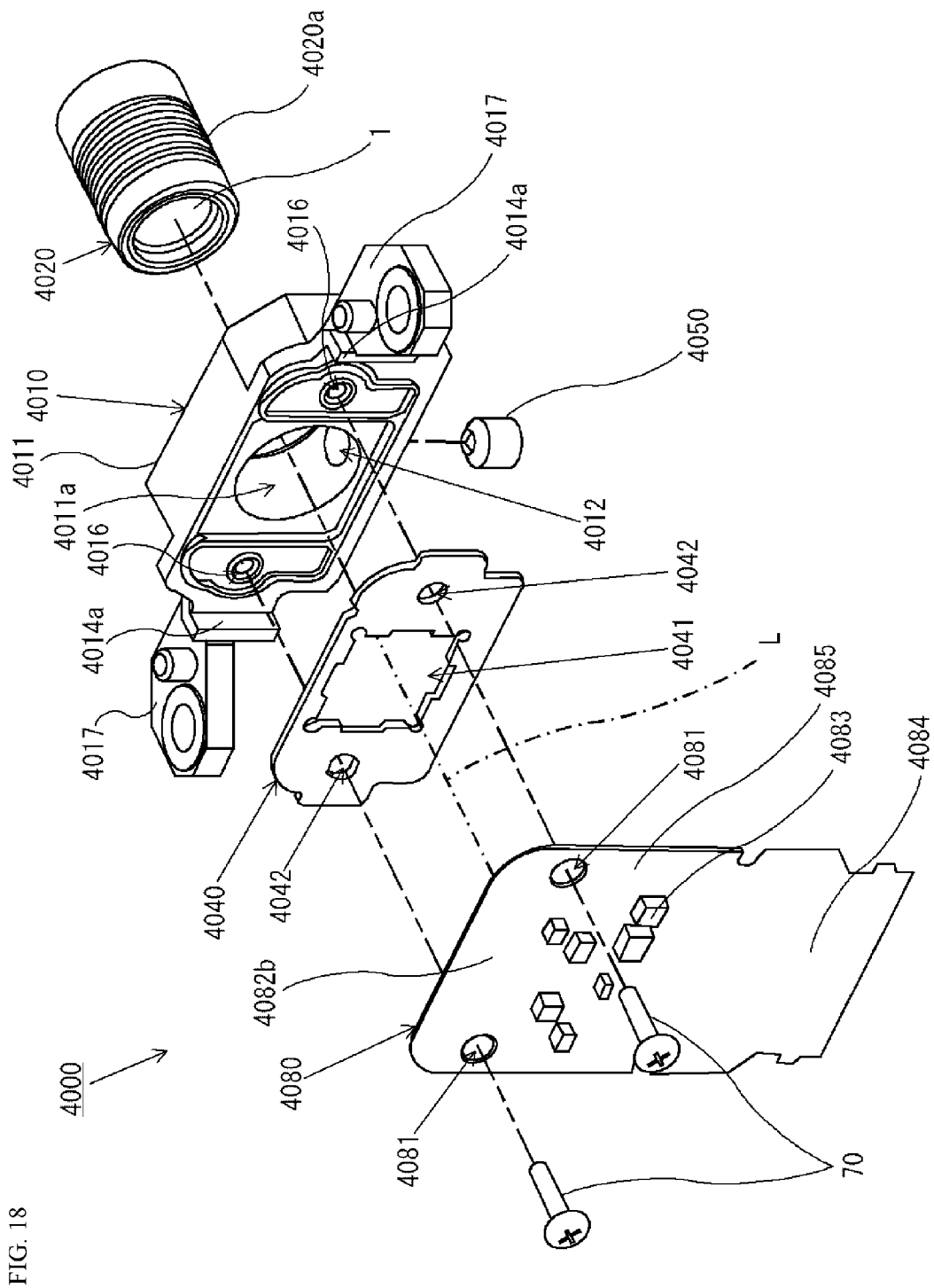
FIG. 18 is an assembly perspective diagram of an imaging device according to the yet other example.
Figure 19:
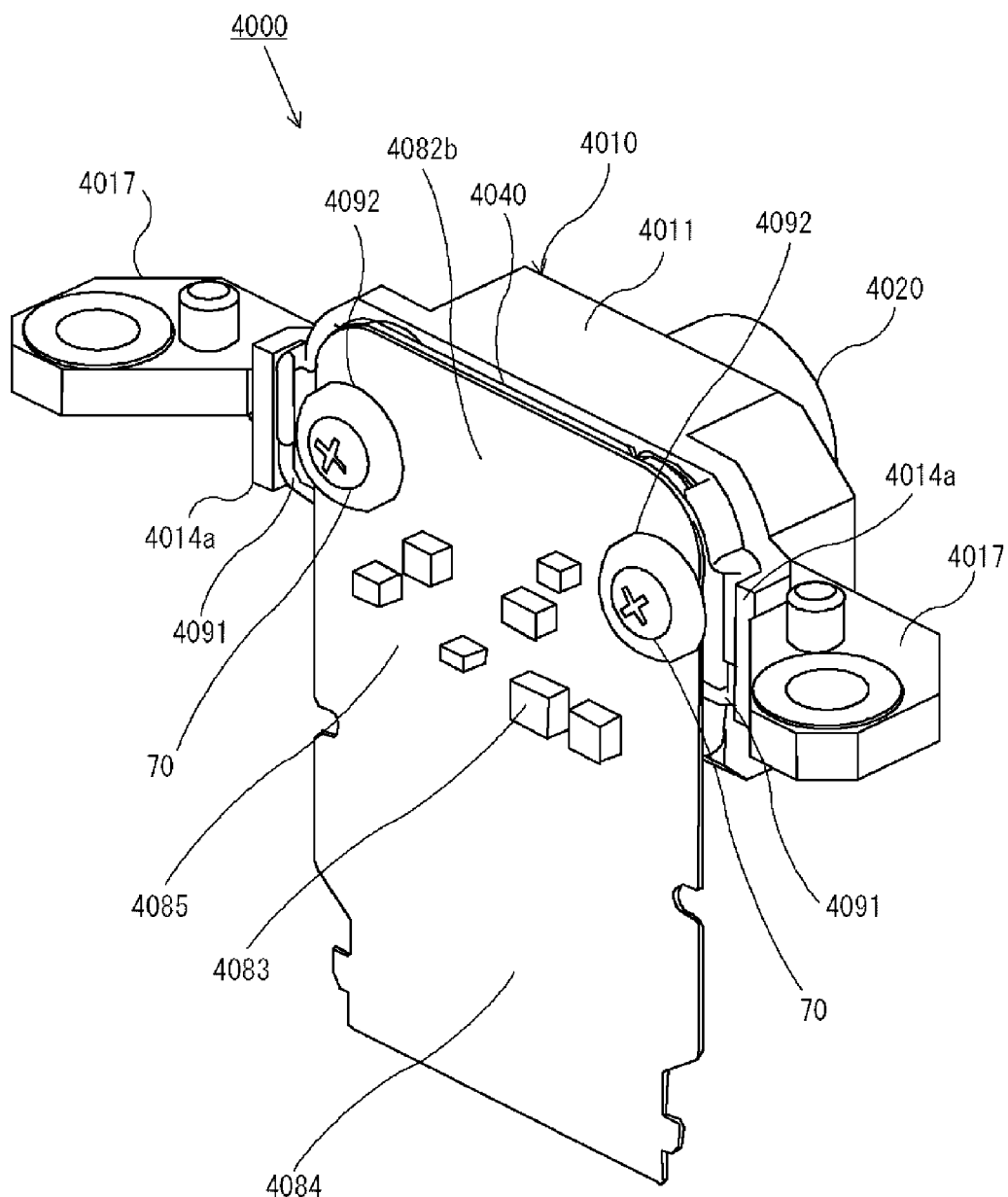
FIG. 19 is a perspective diagram of an imaging device according to the yet other example.
Figure 20:
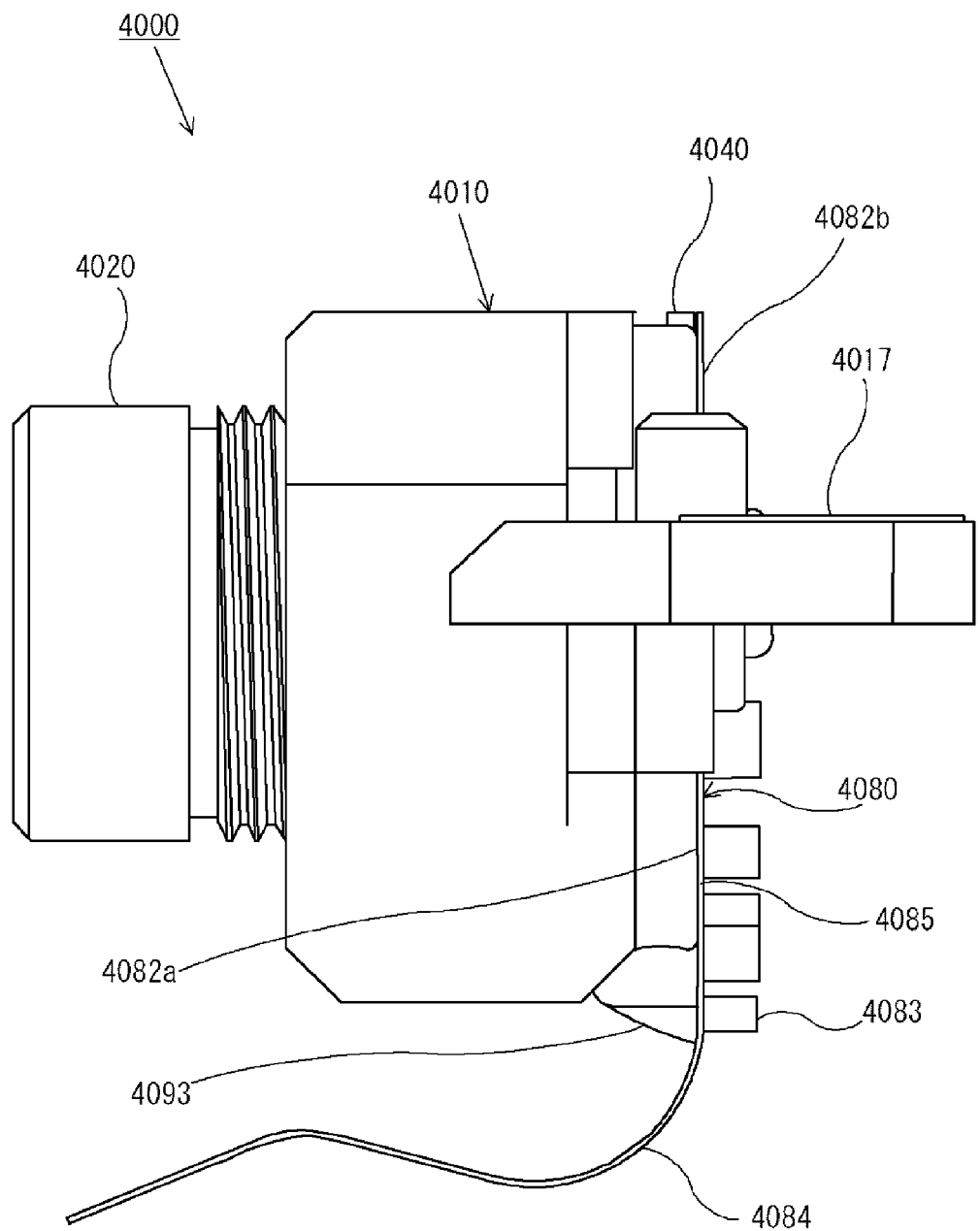
FIG. 20 is a side view of an imaging device according to the yet other example.

The imaging device according to the present example is attached to a vehicle, or the like. As illustrated in FIG. 17 and FIG. 18, the imaging device 4000 according to the present example comprises a lens barrel 4020, a base member 4010, an imaging element 30, a circuit board 4080, a securing plate 4040, screws 70, and a locking screw (pressing members) 4050. Moreover, the imaging device 4000, as illustrated in FIG. 19 and FIG. 20, comprises adhesive agents 4091, 4092, and 4093, interposed between the base member 4010 and the securing plate 4040. Note that structures that are identical to those in the previous example are assigned reference symbols that are the same as those in FIG. 1.

The lens barrel 4020 is formed from a resin material, or the like, into a cylinder, and the lens group 1 is held therein. A male threaded portion 4020a, for securing the lens barrel 4020 to the base member 4010, is formed on the outer peripheral surface of the lens barrel 4020.

The base member 4010 is formed from a resin material, or the like. The base member 4010 comprises a lens barrel retaining portion 4011 for holding the lens barrel 4020, and two attaching portions 4017 for attaching the base member 4010 to a vehicle, or the like.

A through hole (a fourth through hole) 4011a, into which the lens barrel 4020 is inserted, and a connecting hole (a second connecting hole) 4012, which connects from the outside face of the base member 4010 to the through hole 4011a, extending in a direction that is perpendicular to the axis of the through hole 4011a, are provided in the lens barrel retaining portion 4011. A female threaded portion (not shown), for screwing together with the male threaded portion 4020a of the lens barrel 4020, is formed in the through hole 4011a. A female threaded portion 4012a for screwing together with the locking screw 4050 is formed on the inner peripheral surface of the connecting hole 4012. In the through hole 4011a, the axis thereof is essentially coaxial with the optical axis L. The back face 4014 of the base member 4010 is provided with a sidewall portion 4014a that protrudes from the peripheral portion thereof to the securing plate 4040 side. An adhesive agent is filled into a region between this sidewall portion 4014a, the back face 4014 of the base member 4010, and the front face 4043 of the securing plate 4040. There are two screw holes 4016 in the back face 4014 of the base member 4010. Screws 70 are screwed into the screw holes 4016.

A locking screw 4050 is screwed into the female threaded portion 4012a that is formed in the inner peripheral surface of the connecting hole 4012, and in the state wherein the lens barrel 4020 is inserted through the through hole 4011a of the base member 4010, the lens barrel 4020 is pressed in a direction that is perpendicular to the axis of the through hole 4011a. In this case, the tip end portion of the locking screw 4050 presses against the outer peripheral side face of the lens barrel 4020 that is inserted into the through hole 4011a of the base member 4010.

The circuit board 4080 is structured from a sheet-shaped flexible printed circuit board. A circuit board 4080 has the imaging element 30 mounted on one surface side thereof, and electronic components 4083 (first electronic components), such as IC chips, resistors, capacitors, and the like, mounted on the other surface side thereof, where the one surface side whereon the imaging element 30 is mounted faces the base member 4010. The circuit board 4080 has, in the direction of the optical axis L of the lens group 1, a facing portion 4085 that faces the base member 4010, and an extending portion 4084 that extends from the facing portion 4085. Two through holes 4081, into which screws 70 are inserted, are provided in the facing portion 4085. An interconnection (not shown) that is connected to the imaging element 30 is provided at a forward region 4082a of the surface side on which the imaging element 30 is mounted in the facing portion 4085. Moreover, an interconnection (not shown) that is connected to the electronic component 4083 is provided at a rearward region 4082b of the surface side on which the electronic component 4083 is mounted on the facing portion 4085. Both of the through holes 4081 have inner diameters that are larger than the outer diameters of the shaft portions of the screws 70. The extending portion 4084 corresponds to the part that is connected to the connector on the vehicle side when the imaging device 4000 is attached to the vehicle.

The securing plate 4040 has through holes 4042 (fifth through holes) through which the screws 70 pass, at positions corresponding to the screws 70 that are screwed into the base member 4010. Moreover, an essentially rectangular opening portion 4041 that is slightly larger than the external dimension of the imaging element 30, in the plan view, is provided in the securing plate 4040. The securing plate 4040 is made from metal, or the like. Both of the through holes 4042 have inner diameters that are larger than the outer diameters of the shaft portions of the screws 70. The imaging element 30 is secured to the securing plate 4040 through an adhesive agent (not shown) that is filled between the outer edge thereof and the inner edge of the opening portion 4041 of the securing plate 4040.

In a state wherein the screws 70 protrude to the imaging element 30 side of the base member 4010, they are screwed into the base member 4010. Each screw 70 is provided with a shaft portion wherein threads are cut, and a head portion that has an outer diameter that is larger than the outer diameter of the shaft portion. The outer diameter of the shaft portions of the screws 70 is smaller than the inner diameter of the through holes 4042 of the securing plate 4040 and the inner diameter of the through holes 4081 of the circuit board 4080. The outer diameter of the head portions of the screws 70 is greater than the inner diameter of the through holes 4042 of the securing plate 4040 and the inner diameter of the through holes 4081 of the circuit board 4080. The screws 70 are to prevent the securing plate 4040 and the circuit board 4080 from becoming detached from the base member 4010.

Moreover, in a state wherein the tip end portions of the shaft portions of the screws 70 that are screwed into the screw holes 4016 of the base member 4010 are in contact with the bottoms of the screw holes 4016, the screws 70 ensure a uniform gap between the back face 4014 of the base member 4010 and the front face 4043 of the securing plate 4040, and between the circuit board 4080 and the head portions of the screws 70. Here the securing plate 4040 is formed with dimensions to produce the prescribed gap between the circuit board 4080, which is disposed on the back face thereof, and the head portions of the screws 70.

The adhesive agent 4091, as illustrated in FIG. 19, is interposed between the base member 4010 and the securing plate 4040, to secure them both in a non-contact state. The adhesive agent 4091 is filled between the sidewall portion 4014a of the base member 4010 and the peripheral edge of the securing plate 4040, in a state wherein the securing plate 4040 is facing the back face 4014 of the base member 4010, without making contact, with a prescribed gap therebetween. Here the adhesive agent 4091 may be filled between the base member 4010 and the securing plate 4040 after they have been disposed facing each other at the time of manufacturing of the imaging device 4000, or may be coated onto the back face 4014 of the base member 4010, or onto the peripheral edge of the securing plate 4040, prior to the base member 4010 being disposed facing the securing plate 4040.

A portion of the adhesive agent 4092 is interposed between the screws 70 and the inner edges of the through holes 4042 of the securing plate 4040. Moreover, the position in the adhesive agent 4092 that is positioned on the back surface side of the circuit board 4080 is interposed between the head portion of the screw 70 and the circuit board 4080. The adhesive agent 4092 is filled or coated between the screw 70 and the inner edge of the through hole 4042 of the securing plate 4040 (referencing FIG. 18) and between the head portion of the screw 70 and the rearward region 4082b of the circuit board 4080, in a state wherein the screws 70 are screwed into the screw holes 4016 of the base member 4010 (referencing FIG. 18). In this case, the state will be one wherein the back face 4014 of the base member 4010 is away from the front face 4043 of the securing plate 4040, a state wherein the securing plate 4040 is away from the circuit board 4080.

An adhesive agent 4093, as illustrated in FIG. 20, is interposed between the outer edge portion of the base member 4010 and the extending portion 4084 of the circuit board 4080. The adhesive agent 4093 is provided along the outer edge of the base member 4010 in the forward region 4082a of the circuit board 4080. If the adhesive agent 4093, for example, were not provided here, then there would be a concern that when the extending portion 4084 of the circuit board 4080 is flexed in order to attach the imaging device 4000 to the vehicle, the circuit board 4080 could be bent from the part corresponding to the outer edge portion of the base member 4010. In this regard, in the imaging device 4000 according to the present example, the interposition of the adhesive agent 4093 between the outer edge portion of the base member 4010 and the extending portion 4084 of the circuit board 4080 reduces the degree of bending at the position of contact of the circuit board 4080 with the adhesive agent 4093 when the extending portion 4084 of the circuit board 4080 is flexed. Consequently, this is able to prevent damage to the electronic components 4083 that are provided at the positions corresponding to the adhesive agent 4093 in the rearward region 4082b of the circuit board 4080, and to the interconnections that are connected thereto, when the extending portion 4084 of the circuit board 4080 is flexed.

The adhesive agents 4091, 4092, and 4093 are structured from adhesive agents that are, for example, cured through exposure to ultraviolet radiation.

The method for manufacturing the imaging device 4000 according to the present example will be explained next. First, as illustrated in FIG. 17 and FIG. 18, in a state wherein the lens barrel 4020 is inserted into the through hole 4011a of the base member 4010, the locking screw 4050 is screwed into the female threaded portion 4012a that is formed in the through hole 4012 of the base member 4010. Given this, through screwing the locking screw 4050 into the female threaded portion 4012a, the tip end portion of the locking screw 4050 will be pressed against the outer peripheral surface of the lens barrel 4020, producing a state wherein the lens barrel 4020 is pressed against the inner peripheral surface of the through hole 4011a of the base member 4010. This produces a state wherein the base member 4010 holds the lens barrel 4020.

Next, the circuit board 4080 and the securing plate 4040 are disposed facing each other with a prescribed gap (in a non-contact state) to the rear of the base member 4010 that holds the lens barrel 4020. In this case, the circuit board 4080 and the securing plate 4040 are maintained in space by a prescribed holding mechanism. Following this, the shaft portions of the screws 70 are inserted into the through holes 4042 of the securing plate 4040 and into the through holes 4081 of the circuit board 4080, from the rear of the circuit board 4080.

Following this, the tip end portions of the shaft portions of the screws 70 are screwed into the screw holes 4016 of the base member 4010. In this case, the securing plate 4040 and the circuit board 4080 are held in a non-contact state.

Thereafter, the adhesive agent 4091 is filled between the sidewall portion 4014a of the back surface side of the base member 4010 and the outer edge portion of the securing plate 4040. Here the adhesive agent 4091 may be coated instead in advance onto the back face 4014 of the base member 4010 or onto the outer edge of the securing plate 4040.

Following this, the adhesive agent 4092 is filled between the screws 70, the securing plate 4040, and the circuit board 4080, and the adhesive agent 4093 is filled between the base member 4010 and the circuit board 4080.

Following this, a prescribed optical axis adjusting apparatus (not shown) is used to adjust the optical axial position (to adjust the position in the direction of the optical axis L, the position in the direction perpendicular to the optical axis L, and the slope relative to the optical axis L), after which the adhesive agents 4091, 4092, and 4093 are exposed to ultraviolet radiation to cure the adhesive agents 4091, 4092, and 4093.

As explained above, in the imaging device 4000 according to the present example, the outer peripheral face of the lens barrel 4020 is pushed, by the locking screw 4050, against the inner peripheral face of the through hole 4011a of the base member 4010. Through this, play in the lens barrel 4020 is prevented in the state wherein the lens barrel 4020 is attached to the base member 4010, enabling the positional adjustment of the lens group 1, which is secured to the lens barrel 4020, to be carried out accurately in the direction of the optical axis L.

Moreover, with the imaging device 4000 according to the present example, the adhesive agent 4091 that is interposed between the base member 4010 and the securing plate 4040, and the adhesive agent 4092 that is interposed between the head portions of the screws 70 and the circuit board 4080, are cured after adjustment of the optical axis of the imaging element 30. This enables the adjustment of the optical axis of the lens group 1 to be carried out easily and with good accuracy. Moreover, detachment of the securing plate 4040 and the circuit board 4080, on which the imaging element 30 is mounted, from the base member 4010, even if, for example, the adhesive agent 4091 between the base member 4010 and the securing plate 4040 were to come off due to a physical shock from the outside, is prevented by the adhesive agent 4092 that is interposed between the head portions of the screws 70, and the securing plate 4040.

Moreover, given the imaging device 4000 according to the present example, an adhesive agent 4093 is provided interposed between the base member 4010 and the circuit board 4080. This is able to prevent damage to the electronic components 4083 that are provided at the position that corresponds to the adhesive agent 4093 in the rearward region 4082b of the circuit board 4080, and to the interconnections that are connected thereto, when the extending portion 4084 of the circuit board 4080 is flexed when installing the imaging device 4000 onto a vehicle, or the like.

Example 5

Figure 21:
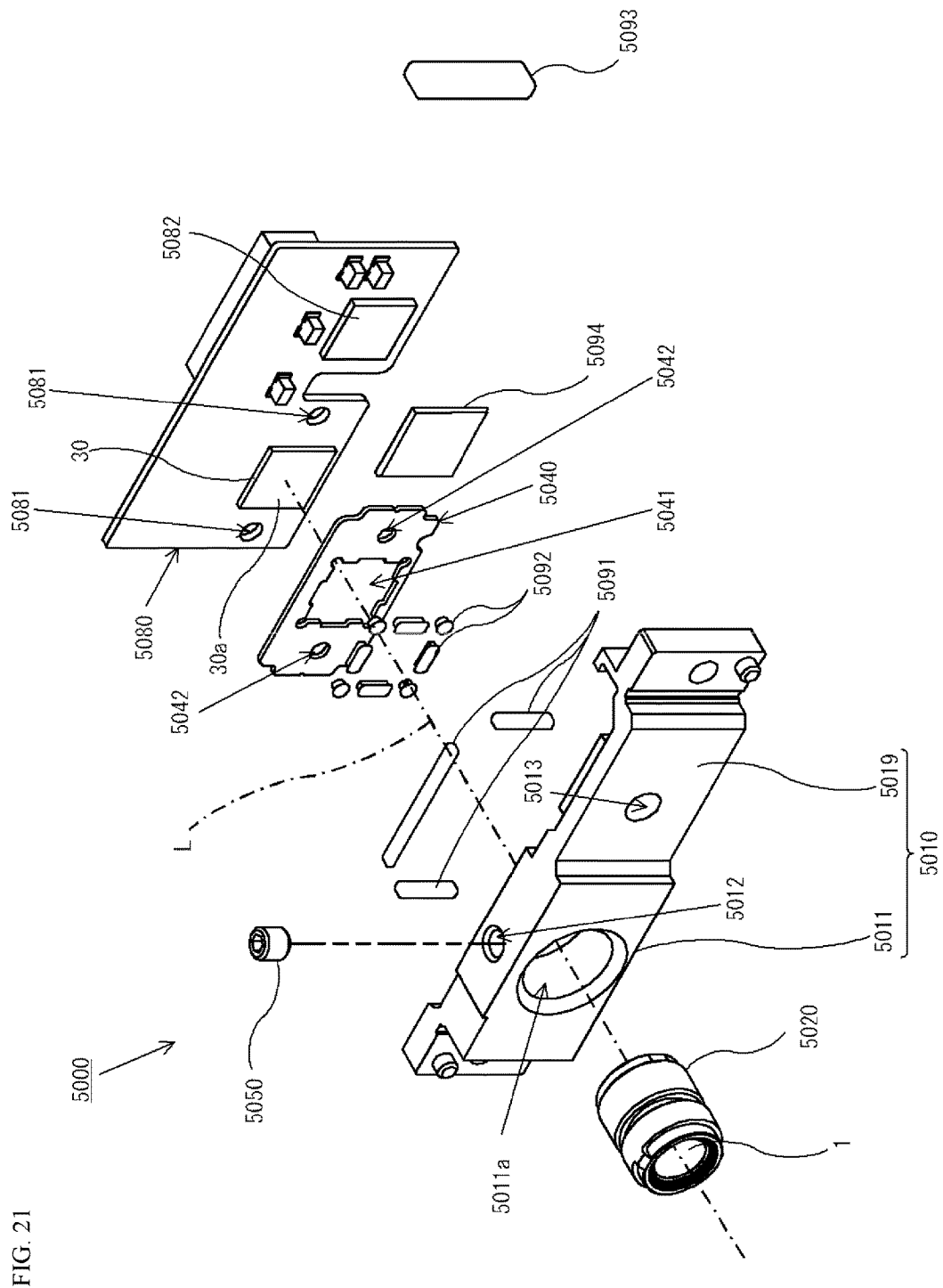
FIG. 21 is an assembly perspective diagram of an imaging device according to an example according to the present invention.
Figure 22A:
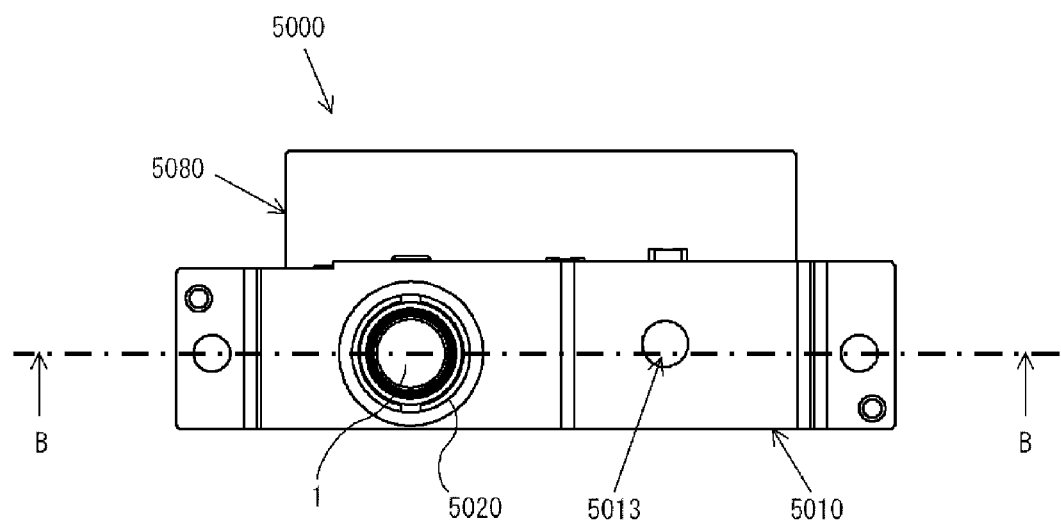
FIG. 22A is a front view of an imaging device according to the example.
Figure 22B:
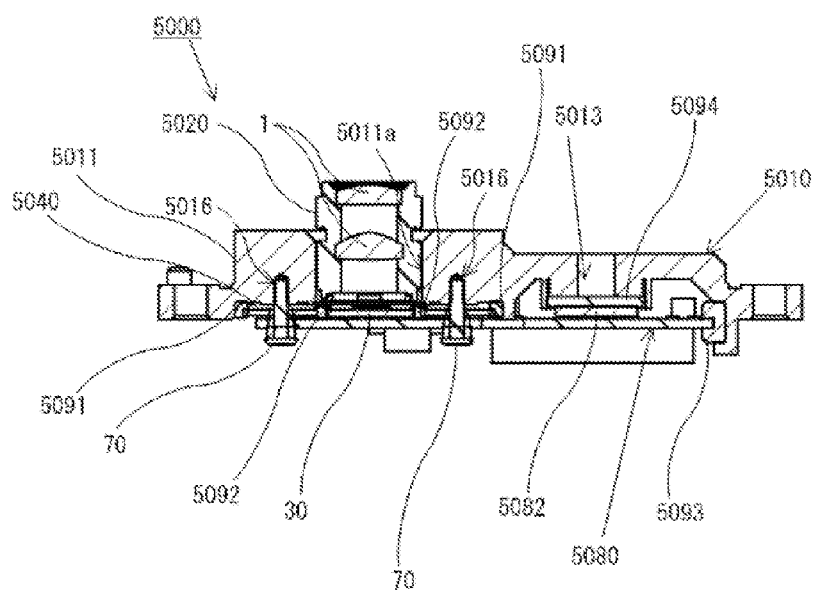
FIG. 22B is a cross-sectional arrow view at the section B-B in FIG. 22A of the imaging device of the example.

As illustrated in FIG. 21, the imaging device 5000 according to the present example is provided with a lens barrel 5020, a base member 5010, an imaging element 30, a communicating module 5082 (a second electronic component), a circuit board 5080, and a securing plate 5040. Moreover, the imaging device 5000 is further provided with adhesive agents 5091, 5092, and 5093, screws 70 (referencing FIG. 22B), a locking screw (a pressing member) 5050, and heat dissipating grease 5094. Note that structures that are identical to those in the example are assigned reference symbols that are the same as those in FIG. 1. In the imaging device 5000, as illustrated in FIG. 22A, the lens barrel 5020 is secured to a position that is offsetted to one side from the center portion in the lengthwise direction of the base member 5010 that is long when viewed from the front face side. Moreover, as illustrated in FIG. 22B, the imaging element 30 and the communicating module 5082 are disposed, on the circuit board 5080, lined up in the lengthwise direction of the base member 5010.

Returning to FIG. 21, the lens barrel 5020 is formed from a resin material, or the like, into a cylinder, and the lens group 1 is held therein.

The imaging element 30 and the communicating module (an electronic component) 5082 are mounted on the same side of the circuit board 5080. Two through holes 5081, into which screws 70 (referencing FIG. 22B) are inserted, are formed on both sides of the imaging element 30 in the circuit board 5080. The circuit board 5080 is disposed so that the side whereon the imaging element 30 and the communicating module 5082 are mounted faces the lens barrel 5020 side.

This base member 5010 is disposed so as to cover the surface side of the circuit board 5080 wherein the imaging element 30 and the communicating module 5082 are mounted. The base member 5010 is formed from a material with relatively high thermal conductivity, such as metal. The base member 5010 is provided with a lens barrel retaining portion 5011 for holding a lens barrel 5020, and a module covering portion 5019, provided adjacent to the lens barrel retaining portion 5011, for covering the communicating module 5082. The lens barrel retaining portion 5011 is provided with a through hole 5011a into which the lens barrel 5020 fits, and a connecting hole 5012 (a second connecting hole) for connecting to the through hole 5011a, extending in a direction that is essentially perpendicular to the axis of the through hole 5011a, from the outside face of the base member 5010. Female threads (not shown) for screwing together with the locking screw 5050 are formed on the inner peripheral surface of the connecting hole 5012. The base member 5010 holds the lens barrel 5020 in a state wherein the tip end portion of the locking screw 5050 that is inserted into the through hole 5012 is pressed against the outer peripheral surface of the lens barrel 5020 that is fitted into the through hole 5011a. Moreover, as illustrated in FIG. 22B, the base member 5010 is provided with screw holes 5016, into which the screws 70 are screwed, and a through hole (a sixth through hole) 5013 that structures a grease filling duct for filling heat dissipating grease 5094 between the base member 5010 and the communicating module 5082. The through hole 5013 is formed, in the base member 5010, in a position that faces the communicating module 5082 in a direction that is perpendicular to the surface of the circuit board 5080 on which the imaging element 30 and the communicating module 5082 are mounted.

A locking screw 5050 is screwed into the female threaded portion (not shown) that is formed in the inner peripheral surface of the connecting hole 5012, and in the state wherein the lens barrel 5020 is inserted through the through hole 5011a of the base member 5010, the lens barrel 5020 is pressed in a direction that is perpendicular to the axis of the through hole 5011a. In this case, the tip end portion of the locking screw 5050 presses against the outer peripheral side face of the lens barrel 5020 that is inserted into the through hole 5011a of the base member 5010.

The securing plate 5040 is formed in a plate shape from metal, or the like. An essentially rectangular opening portion 5041 that is slightly larger than the external dimension of the imaging element 30, in the plan view, and two through holes 5042, through which screws 70 (referencing FIG. 22B) are passed, are provided in the securing plate 5040. The imaging element 30 is secured to the securing plate 5040 through an adhesive agent 5092 that is filled between the outer edge thereof and the inner edge of the opening portion 5041 of the securing plate 5040. The adhesive agent 5092 is cured through, for example, exposure to ultraviolet radiation.

As illustrated in FIG. 22B, screws 70 are screwed into the base member 5010. The screws 70 are to prevent the securing plate 5040 and the circuit board 5080 from becoming detached from the base member 5010. Moreover, in a state wherein the screws 70 are screwed into the screw holes 5016 of the base member 5010 and the tip end portions of the shaft portions of the screws 70 are in contact with the bottoms of the screw holes 5016, a gap is secured between the base member 5010 and the securing plate 5040.

Returning to FIG. 21, an adhesive agent 5091 is filled between the base member 5010 and the securing plate 5040. The adhesive agent 5091 is filled between the base member 5010 and the securing plate 5040 in a state wherein the base member 5010 is in contact with the securing plate 5040. The adhesive agent 5091 is structured from an adhesive agent that is, for example, cured through exposure to ultraviolet radiation.

An adhesive agent 5093 is filled between the base member 5010 and the circuit board 5080, on the side of the circuit board 5080 with the communicating module 5082. The adhesive agent 5093 is cured through, for example, exposure to ultraviolet radiation.

The heat dissipating grease 5094, as illustrated in FIG. 22B, is interposed between the base member 5010 and the communicating module 5082, and is for carrying, to the base member 5010, the heat that is produced in the communicating module 5082. The heat dissipating grease 5094 is filled between the base member 5010 and the circuit board 5080 through the through hole 5013 of the base member 5010 in a state wherein the screws 70 that have been inserted through the through holes 5081 of the circuit board 5080 and the through holes 5042 of the securing plate 5040 have been screwed into the screw holes 5016 of the base member 5010.

The method for manufacturing the imaging device 5000 according to the present example will be explained next. First, in a state wherein the lens barrel 5020 is inserted into the through hole 5011a of the base member 5010, the locking screw 5050 is screwed into the female threaded portion that is formed in the insertion hole 5012 of the base member 5010. Given this, through screwing the locking screw 5050 into the female threaded portion, the tip end portion of the locking screw 5050 will be pressed against the outer peripheral surface of the lens barrel 5020, producing a state wherein the lens barrel 5020 is pressed against the inner peripheral surface of the through hole 5011a of the base member 5010. This produces a state wherein the base member 5010 holds the lens barrel 5020.

Next the securing plate 5040 and the circuit board 5080 are disposed behind the base member 5010 that is holding the lens barrel 5020. Following this, as illustrated in FIG. 22B, the shaft portions of the screws 70 are inserted, from the rear of the circuit board 5080, into the through holes 5042 of the securing plate 5040 and the through holes 5081 of the circuit board 5080, and screwed into the screw holes 5016 of the base member 5010.

Following this, the adhesive agents 5091 and 5092 are filled between back face side of the base member 5010 and the securing plate 5040, and the adhesive agent 5093 is filled between the base member 5010 and the circuit board 5080 on the circuit board 5080 side.

Following this, after the adjustment of the optical axis using a centering adjusting instrument, the adhesive agents 5091, 5092, and 5093 are exposed to ultraviolet radiation, to cure the adhesive agents 5091, 5092, and 5093.

Finally, the heat dissipating grease 5094 is filled into the base member 5010 through the through hole 5013. In this case, a syringe (not shown), for example, that is filled with heat dissipating grease is inserted into the through hole 5013, and the heat dissipating grease 5094 is filled between the base member 5010 and the circuit board 5080.

As explained above, in the imaging device 5000 according to the present example, the outer peripheral surface of the lens barrel 5020 is pushed, by the locking screw 5050, against the inner peripheral surface of the through hole 5011*a* of the base member 5010. Through this, play in the lens barrel 5020 is prevented in the state wherein the lens barrel 5020 is attached to the base member 5010, enabling the positional adjustment of the lens group 1, which is secured to the lens barrel 5020, to be carried out accurately in the direction of the optical axis L.

Moreover, conventionally, the coating of the heat dissipating grease onto the circuit board typically is performed prior to adjusting the optical axis of the imaging element 30. In such a case, the heat dissipating grease that has been coated onto the circuit board interferes with the base member 5010, and the like, when the optical axis of the imaging element 30 is adjusted, which may reduce the accuracy of the adjustment of the optical axis.

In this regard, given the imaging device 5000 according to the present example, the adhesive agent 5091 and 5092 that are interposed between the base member 5010 and the securing plate 5040, and the adhesive agent 5093 that is interposed between the base member 5010 and the circuit board 5080, are cured after adjustment of the optical axis of the imaging element 30. The heat dissipating grease 5094 is filled thereafter. Because the adhesive agents 5091, 5092, and 5093 have been cured, this enables prevention of shifting of the optical axis of the imaging element 30 when the heat dissipating grease 5094 is filled.

MODIFIED EXAMPLE

While examples according the present invention have been explained above, the present invention is not limited to the examples set forth above. For example, the screws 70 may instead be secured to the base member 10 prior to completion of the optical axis adjustment of the lens group 1, after the securing plate 40 has been brought into contact with the back face 14 of the base member 10.

In the example, described above, the explanation was for a structure that was equipped with both a base member 10, which has a front guiding portion 11*b* and a back guiding portion 11*c*, and a lens barrel 20, which has a front guiding portion 23 and a back guiding portion 24. However, there is no limitation thereto, but instead the structure may be one wherein, for example, the base member has only a back guiding portion or a front guiding portion, and the lens barrel has only a back guiding portion or a front guiding portion.

Moreover, while in that example, described above, the explanation was for a case wherein the guiding portions (the front guiding portion 11*b* and the back guiding portion 11*c*) contact guided portions (the front guiding portion 23 and the back guiding portion 24), the shapes of the guiding portions and of the guided portions are not limited thereto, but rather the structure may be, for example, one wherein a portion of the guiding portion contacts the guided portion.

While in the examples described above the explanations were for examples wherein the imaging devices 1000, 2000, 3000, 4000, and 5000 were provided with lens groups that were structured from two lenses 1, the number of lenses 1 for structuring the lens group is not limited to two. The lens group 1 may be structured from a single lens 1, or may be structured from three or more lenses 1.

While in the other example, set forth above, the explanation was for a structure that was equipped with a leaf spring 3050, there is no limitation thereto, but rather the structure may be one that is provided with a tension spring or a compression spring that uses a wire rod such as of piano wire, or the like, instead of the leaf spring 3050. Moreover, while in the example, described above, the explanation was for an example wherein the leaf spring 3050 was made of metal, the material for forming the leaf spring 3050 is not limited thereto, but rather the formation thereof may be from for example, a resin material instead.

In the example, described above, the explanation was for an example wherein a portion of the electronic components 4083 were disposed in the vicinity of a boundary part with the facing portion 4085 of the extending portion 4084 of the circuit board 4080, but the arrangement of the electronic components 4083 is not limited thereto. For example, the structure may be one wherein all of the electronic components 4083 are disposed on the facing portion 4085.

In each of the examples described above, the explanations were for structures wherein the lens barrel was attached to the base member through the male threaded portion of the lens barrel being threaded into the female threaded portion that is formed in the through hole of the base member. However, the method for attaching the lens barrel to the base member is not limited thereto. For example, the structure may be one wherein the lens barrel is secured to the base member through screws, or may be one wherein securing to the base member is through some other securing member.

While in each of the examples the explanations were for examples wherein a lens group 1 is held in the lens barrel 20, there is no limitation thereto, but rather, for example, the structure may be one wherein the lens barrel 20 holds diaphragms, filters, or the like.

While examples according to the present invention were described in detail, referencing the drawings, the specific structures thereof are not limited to these examples, but rather design variations within a range that does not deviate from the spirit and intent of the present invention are also included in the present invention.

The present invention may be embodied and modified in a variety of ways without deviating from the spirit or intent of the present invention, as broadly defined. Moreover, the examples set forth above are to explain this invention, and do not limit the scope of the present invention. That is, the scope of the present invention is defined by the claims, not the examples. Moreover, various modifications carried out within the scope of meaning of the invention within the claims or equivalents thereto are considered to be within the scope of the present invention.

The present application is based on the Specifications and Patent Claims of Japanese Patent Application 2014-194815 (filed on Sep. 25, 2014), Japanese Patent Application 2014-266805 (filed on Dec. 27, 2014), and Japanese Patent Application 2014-196782 (filed on Sep. 26, 2014). The present application incorporates by reference the Specifications and Patent Claims of Japanese Patent Application 2014-194815, Japanese Patent Application 2014-266805, and Japanese Patent Application 2014-196782.

The present invention can be applied, of course, as an imaging device for a vehicle-mounted camera, a monitoring camera, or the like, and is also useful in digital cameras, video cameras, and other imaging devices for recognition or imaging (such as, cameras for medical treatments such as endoscope cameras, camcorders (movie cameras) for capturing video, various types of inspection cameras, cameras for robots, and the like), and also useful in electronic devices such as mobile telephones, tablets, personal computers, and the like.

The invention claimed is:

1. An imaging device comprising:
    a lens group;
    a lens barrel holding the lens group;
    a lens barrel holding member holding the lens barrel;
    an imaging element;
    a securing plate that is disposed facing at least a portion of the lens barrel holding member in a state wherein the imaging element is secured; and
    a pressing member pressing the lens barrel to produce a state wherein at least a portion of the lens barrel is pressed against a portion of the lens barrel holding member, wherein:
    the lens barrel holding member comprises a through hole into which the lens barrel is inserted, and a connecting hole connecting from the outside face of the lens barrel holding member to the through hole, extending in a direction that is perpendicular to the axis of the through hole; and
    the pressing member is attached to the lens barrel holding member in a state wherein at least a portion thereof is fitted into the connecting hole, and presses the lens barrel in a direction that is perpendicular to the axis of the through hole, in a state wherein the lens barrel is inserted into the through hole,
    wherein the pressing member comprises:
        a plate-shaped main piece; and
        an elastic portion that can deform elastically,
            wherein the main piece contacts the outer peripheral surface of the main barrel in a state wherein the lens barrel is inserted into the through hole, and
            wherein the elastic portion presses the main piece in a direction that is perpendicular to the axis of the through hole, through an elastic force that is produced through elastic deformation.

2. The imaging device as set forth in claim 1, wherein:
    the lens barrel comprises a male threaded portion that is formed on an outer peripheral surface of the lens barrel; and
    the lens barrel holding member comprises:
    a female threaded portion, formed on an inner peripheral surface of the through hole, screwing together with the male threaded portion.

3. The imaging device as set forth in claim 2, wherein:
    an inclined surface for structuring a ridge portion of the male threaded portion is in facial contact with an inclined surface structuring a trough portion of the female threaded portion.

4. The imaging device as set forth in claim 1, further comprising:
    a circuit board comprising the imaging element mounted on one surface side thereof and comprising a first electronic component mounted on the other surface side thereof, disposed on the opposite side of the securing plate from the lens barrel holding member; and
    an adhesive agent that is interposed between the lens barrel holding member, the circuit board, and the securing plate, wherein:
    a female threaded portion is formed on an inner peripheral surface of the connecting hole; and
    the pressing member is structured from a locking screw that screws together with the female threaded portion and that presses the lens barrel in a direction that is perpendicular to the axis of the through hole, in a state wherein the lens barrel is inserted through the through hole.

5. The imaging device as set forth in claim 4, wherein:
    the first electronic component is mounted on the circuit board, on the other surface side that is not the facing portion that faces the lens barrel holding member in the direction of the optical axis of the lens group.

6. The imaging device as set forth in claim 5, wherein:
    the circuit board is structured from a sheet-shaped flexible printed circuit board and further comprises an extending portion that extends from the facing portion; and
    a portion of the adhesive agent is interposed between the lens barrel holding member and the extending portion.

7. The imaging device as set forth in claim 4, further comprising:
    a securing member that is long and thin, for securing the lens barrel holding member in a state wherein the lens barrel holding member protrudes toward the imaging element side, wherein:
    the securing plate comprises a through hole through which the securing member is inserted, in a state wherein there is a gap from the side face of the securing member, at a position that corresponds to the securing member that is secured to the lens barrel holding member; and
    a portion of the adhesive agent is disposed in a gap that is produced between the securing member and the through hole of the securing plate.

8. The imaging device as set forth in claim 4, further comprising:
    a second electronic component that is mounted on the one side surface of the circuit board; and
    a heat dissipating grease, interposed between the lens barrel holding member and the second electronic component, for transmitting, to the lens barrel holding member, the heat that is produced by the second electronic component, wherein:
    the lens barrel holding member is disposed so as to cover the one surface side of the circuit board, and comprises a grease filling duct for filling the heat dissipating grease between the lens barrel holding member and the second electronic component.

9. The imaging device as set forth in claim 8, wherein:
    the grease filling duct is structured in the lens barrel holding member from a through hole that is formed in a position that faces the second electronic component in a direction that is perpendicular to the face of the circuit board on which the imaging element and the second electronic component are mounted.

* * * * *